United States Patent
Okauchi et al.

(10) Patent No.: US 6,600,461 B1
(45) Date of Patent: *Jul. 29, 2003

(54) DISPLAY APPARATUS AND CONTROL METHOD THEREFOR

(75) Inventors: Shigeki Okauchi, Kodaira (JP); Sunao Kurahashi, Kawasaki (JP); Satoshi Tonosaki, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/540,897

(22) Filed: Oct. 11, 1995

(30) Foreign Application Priority Data

Oct. 12, 1994 (JP) .................................... 6-246255
Nov. 18, 1994 (JP) .................................... 6-285692

(51) Int. Cl.⁷ .................................................. G09G 5/00
(52) U.S. Cl. .......................................................... 345/8
(58) Field of Search ............................ 345/7, 8, 9, 112, 345/204

(56) References Cited

U.S. PATENT DOCUMENTS

| | | | | |
|---|---|---|---|---|
| 4,636,866 A | * | 1/1987 | Hattori ...................... 358/236 |
| 5,003,300 A | * | 3/1991 | Wells ......................... 340/705 |
| 5,266,930 A | * | 11/1993 | Ichikawa et al. ............... 345/8 |
| 5,543,816 A | * | 8/1996 | Heacock ........................ 345/8 |
| 5,579,026 A | * | 11/1996 | Tabata .......................... 345/8 |
| 5,621,424 A | * | 4/1997 | Shimada ........................ 345/8 |
| 5,642,221 A | * | 6/1997 | Fisher et al. ................... 345/8 |
| 5,662,523 A | * | 9/1997 | Yasumaru et al. ............... 345/8 |
| 5,696,521 A | * | 12/1997 | Robinson et al. ............... 345/8 |

* cited by examiner

Primary Examiner—Richard Hjerpe
Assistant Examiner—Ronald Laneau
(74) Attorney, Agent, or Firm—Morgan & Finnegan L.L.P.

(57) ABSTRACT

A display apparatus includes a plurality of adjustment units for performing diopter adjustment, base length adjustment, and vergence angle adjustment in accordance with the characteristics of users, and a storage unit for storing pieces of operation condition information of the users of the display apparatus. With this arrangement, when the display apparatus is to be used, the respective adjustment units can be adjusted in accordance with the operation condition information stored in the storage unit, thereby reducing troubles with adjusting operations and simplifying the adjusting operations of the respective adjustment units. In addition, the operability of the apparatus in consideration of a plurality of users is greatly improved.

36 Claims, 19 Drawing Sheets

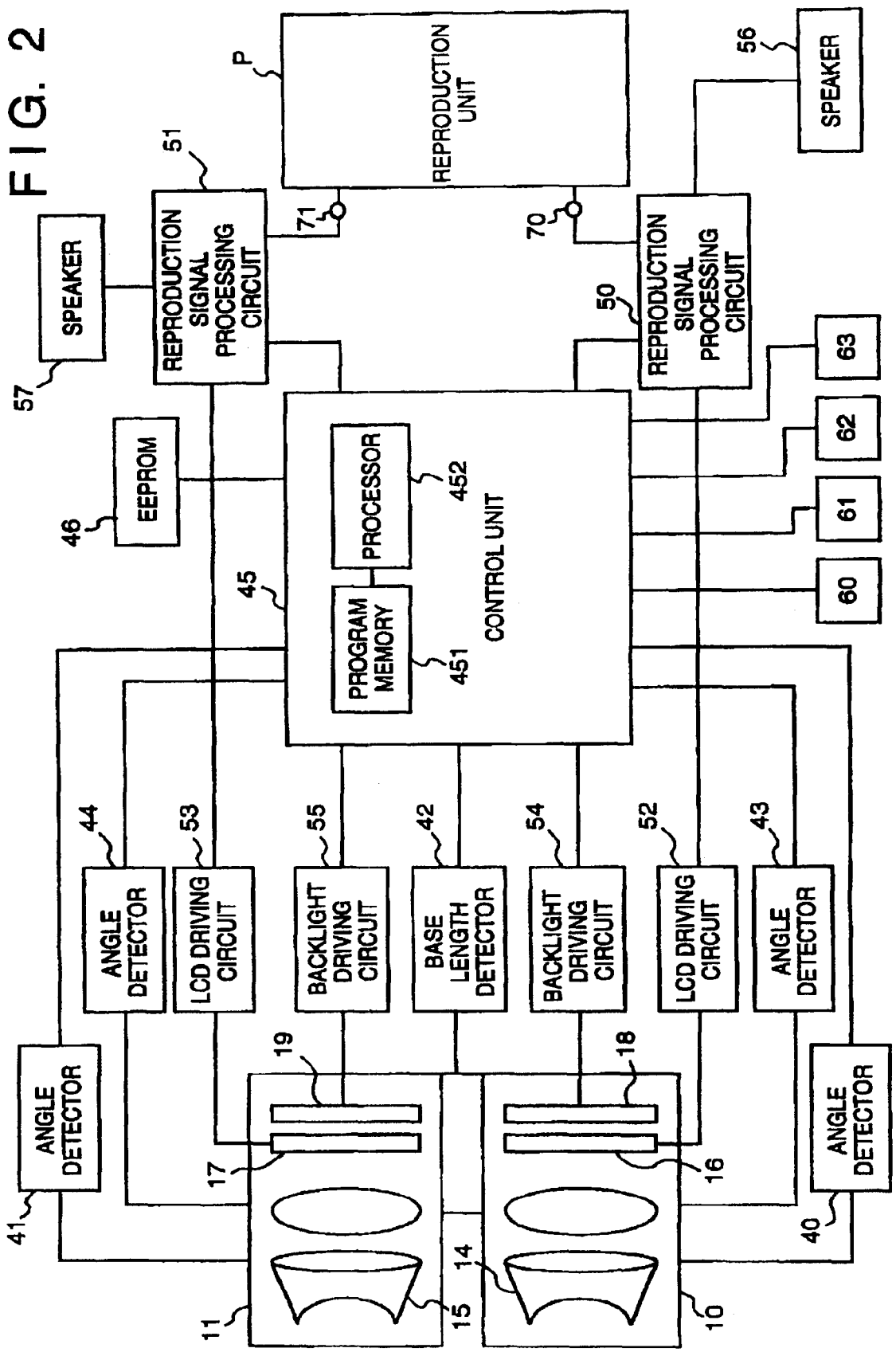

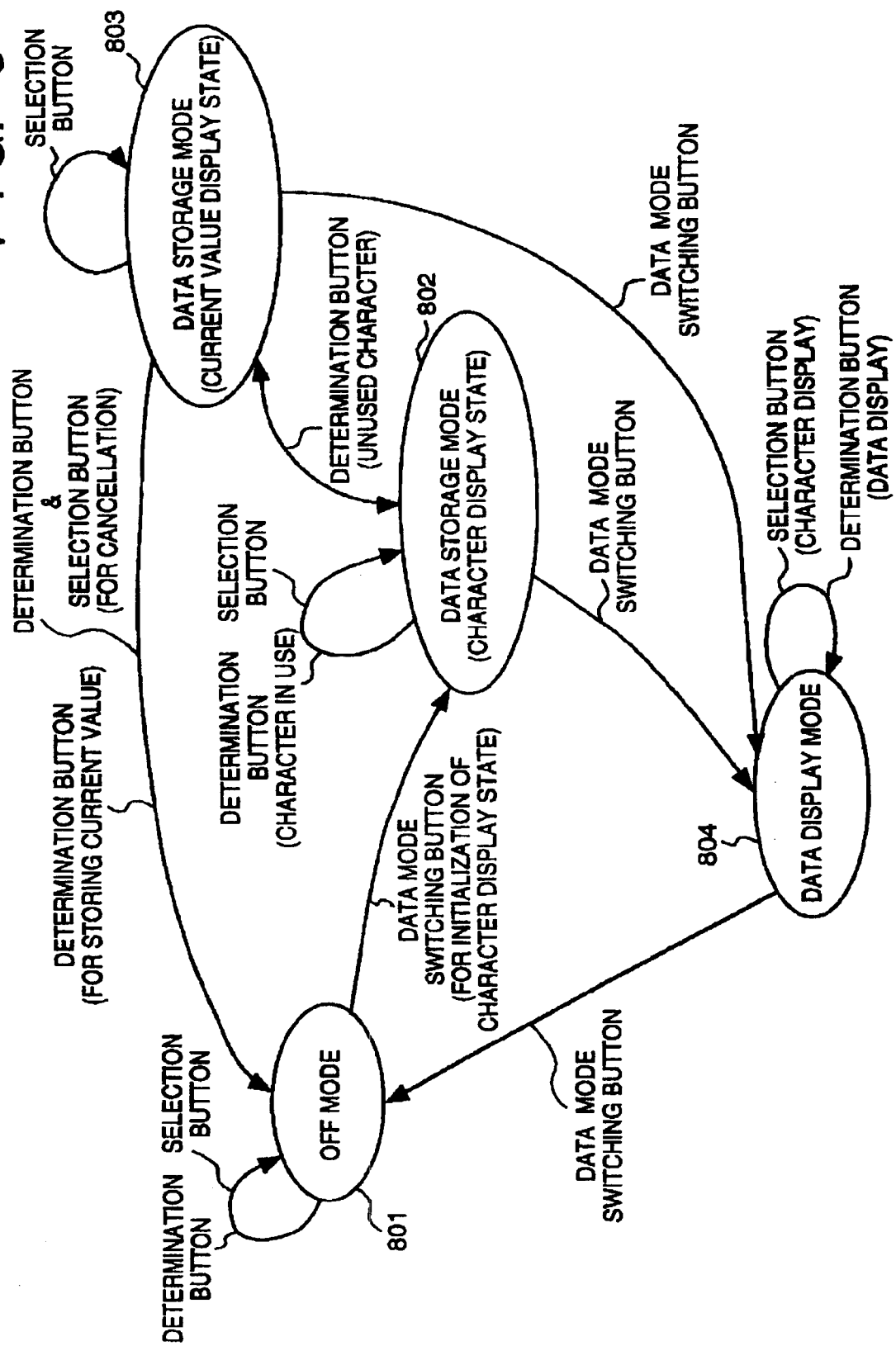

DISPLAY APPARATUS AND CONTROL METHOD THEREFOR

BACKGROUND OF THE INVENTION

1. Field of the Invention

The present invention relates to a display apparatus such as a display apparatus which uses a liquid crystal panel or the like and is suitable for private use.

2. Description of the Related Art

Recently, a display apparatus like goggles to be mounted on the head of a user has been developed. This apparatus is designed to display images obtained by two cameras or CG images for the left and right eyes through displays so as to allow the user to enjoy the images in a normal manner or provide stereoscopic or panoramic vision.

FIG. 22 shows such a display apparatus. This display apparatus is in the form of goggles to be mounted on the head of a user. The apparatus uses two small liquid crystal display panels (LCDs) to display images for the left and right eyes.

These images are enlarged by lenses to display virtual image so as to make the user feel, for example, as if a 30-inch television set were present at a distance of about 1 m. The user therefore can enjoy image display as if he were watching a large-screen television set, even though the above display apparatus is a small device.

This display apparatus is mainly constituted by a display unit D, backlights, LCDs, lens groups, and the like. The distance between the display units can be adjusted in accordance with the distance (base length) of the left and right eyes of an observer. In addition, diopter adjustment can be performed on the left and right eyes. For example, techniques associated with such adjustment are disclosed in Japanese Patent Laid-Open Nos. 5-48991 and 5-183839.

When, however, the conventional display apparatus is to be used by a plurality of users, the above adjustment must be performed every time a user uses the apparatus. This adjustment is a cumbersome operation. When the display apparatus is to be used in a home or office, in particular, the apparatus is frequently used by a plurality of users. Demands therefore have arisen for an adjustment unit which allows easy adjustment.

SUMMARY OF THE INVENTION

The present invention has been made in consideration of the above problem, and has as its object to simplify an adjusting operation in using a display apparatus of the type designed to be fixed on the face or head of a user.

It is another object of the present invention to provide a display apparatus comprising:

display means including a plurality of display nits;
imaging means for forming images displayed on the display units through optical systems;
adjustment means for adjusting the display means in a desired state;
detection means for detecting the state adjusted by the adjustment means;
storage means for storing the state detected by the detection means; and
output means for outputting the state stored in the storage means.

It is still another object of the present invention to provide a method of controlling a display apparatus including a pair of display units, comprising:

the adjustment step of adjusting a state of each unit of the display apparatus;
the storage step of storing each state adjusted in the adjustment step; and
the display step of displaying each state stored in the storage step.

It is still another object of the present invention to provide a display apparatus comprising:

display means including a plurality of display units;
imaging means for forming images displayed on the display units through optical systems;
adjustment means for adjusting a state of the display means to a desired state, the state including a diopter based on the imaging means, a base length of the pair of display units, and a vergence angle of the pair of display units;
detection means for detecting the state adjusted by the adjustment means;
storage means for storing the state detected by the detection means; and
display means for displaying the state stored in the storage means.

It is still another object of the present invention to provide a display apparatus comprising:

display means including a plurality of display units;
imaging means for forming images displayed on the display units through optical systems;
adjustment means for adjusting a state of the display means to a desired state, the state including a diopter based on the imaging means, a base length of the pair of display units, and a brightness of each display unit;
detection means for detecting the state adjusted by the adjustment means;
storage means for storing the state detected by the detection means; and
setting means for setting a state of the display means on the basis of the state stored in the storage means.

It is still another object of the present invention to provide a display apparatus comprising:

display means including a plurality of display units;
imaging means for forming images displayed on the display units through optical systems;
adjustment means for adjusting a state of the display means to a desired state, the state including a diopter based on the imaging means and a base length of the pair of display units;
detection means for detecting the state adjusted by the adjustment means;
storage means for storing the state detected by the detection means if the state continues for not less than a predetermined period of time; and
output means for outputting the state stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing a display apparatus according to an embodiment of the present invention;

FIG. 8 is a view showing a state transition between the respective modes in the first embodiment;

DETAILED DESCRIPTION OF THE PREFERRED EMBODIMENTS

First Embodiment

A display apparatus according to an embodiment of the present invention will be described below with reference to the accompanying drawings.

Figure 1:
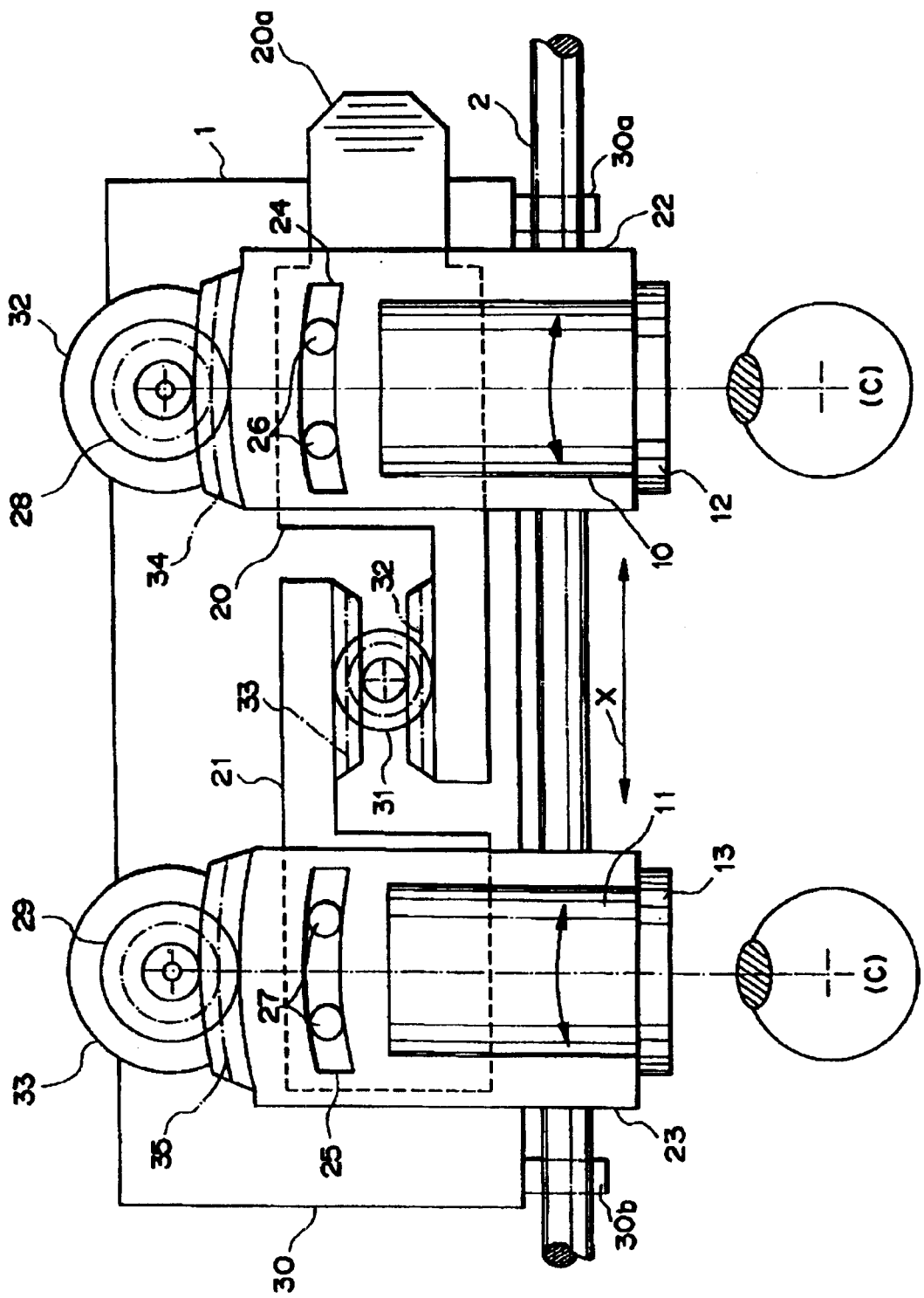
FIG. 1 is a view for explaining the mechanism of a display apparatus of the present invention.

FIG. 1 shows the detailed mechanisms of display units of a display apparatus 1 of this embodiment. Referring to FIG. 1, reference numeral 10 denotes a right-eye display unit; and 11, a left-eye display unit. Each display unit is constituted by a lens group, an LCD, and a backlight (each of which will be described later).

Reference numerals 12 and 13 denote diopter adjustment dials for moving portions of the lens groups of the right- and left-eye display units 10 and 11 to change their focal lengths, thereby changing the imaging positions. Graduations are marked on the dials 12 and 13, and the user can see diopter adjustment values by indexes arranged on the right and left display units.

Reference numeral 30 denotes a frame which is integral with the apparatus body to be mounted on the head of the user; and 20 and 21, right and left base-length bases designed to be slidable in the X direction in FIG. 1. Linear racks 36 and 37 are respectively disposed on the right and left base-length bases 20 and 21 and meshed with a gear 31 pivotally supported by the frame 30.

A knob 20a is formed on the right base-length base 20. When the user moves the right base-length base 20 in the X direction while holding the knob 20a in accordance with the base length of the user, the left base-length base 21 is also driven by the gear 31 to be moved in the opposite direction by the same moving amount as that of the right base-length base 20. Graduations are marked on the knob 20a, and the user can see base lengths by indexes arranged in the display apparatus body.

Reference numerals 22 and 23 denotes-vergence bases 22 and 23 rotatably supported by the right and left base-length bases 20 and 21. The right and left vergence bases 22 and 23 respectively have rotation guide grooves 24 and 25 each arced about the center (C) of each eyeball positioned at the designed optical axis of each lens.

These rotation guide grooves 24 and 25 are respectively engaged with two pairs of pins 26 and 27 formed upright on the base-length bases 20 and 21 to be rotatable about the centers (C) of the eyeballs.

In addition, the right and left vergence bases 22 and 23 respectively have racks 34 and 35 each arced about the center (C) of the eyeball, and are meshed with gears 28 and 29 mounted on vergence angle dials 32 and 33 for rotating/driving the vergence angle dials 32 and 33.

When the vergence angle dials 32 and 33 are rotated, the right- and left-eye display units 10 and 11 are rotated while their optical axes are directed to the centers (C) of the right and left eyeballs. Graduations are marked on these vergence angle dials 32 and 33, and the user can set vergence angles by indexes arranged in the display apparatus body.

The frame 30 is coupled to a head contact portion 2 through coupling portions 30a and 30b, and the display apparatus body can be moved in the X direction in FIG. 1 with a frictional resistance.

The display apparatus having the above arrangement displays identical images on the left- and right-eye display units, and also displays images with the parallax of the left and right eyes, thereby allowing the apparatus to be used as a stereoscopic display.

The internal arrangement of the display apparatus 1 of the present invention will be described in detail next with reference to the block diagram in FIG. 2. As shown in FIG. 2, right- and left-eye image signals reproduced by a reproduction unit P are input to the display apparatus through image signal input terminals 70 and 71.

The input right- and left-eye image signals are respectively input to the LCD driving circuits 52 and 53 through reproduction signal processing circuits 50 and 51. The LCDs are then driven in accordance with the input image signals.

Reference numerals 54 and 55 denote backlight driving circuits; and 56 and 57, the right and left headphone speakers.

The LCD driving circuits 52 and 53 are controlled by a control unit 45 and can output image and sound signals from the control unit 45 as well as images from the reproduction unit P.

As described above, the apparatus includes the two display units, i.e., the right- and left-eye display units 10 and 11, which are respectively constituted by lens groups 14 and 15, LCDs 16 and 17, and backlights 18 and 19. Reference numerals 40 and 41 denote angle detectors for respectively detecting the angles of the diopter adjustment dials 12 and 13 of the right- and left-eye display units 10 and 11. The detected angles are input to the control unit 45 and recognized as values converted as diopter adjustment values determined by graduations of the dials and indexes.

Reference numeral 42 denotes a base length detector for detecting the positions of the base-length bases of the above base length adjustment mechanism. The detected position data is input to the control unit 45 and recognized as a base length value determined by and index of the apparatus body and a graduation of the knob 20a.

Reference numerals 43 and 44 denote angle detectors for detecting the angles of the right and left vergence angle dials 32 and 33. The detected angles are input to the control unit 45 and recognized as values converted as vergence angle values determined by graduations of the dials and indexes. Reference numeral 46 denotes an EEPROM for storing the diopter adjustment values and the base length values in the right and left-eye display units 10 and 11 and vergence angle values.

As the angle detectors 40, 41, 43, and 44, general absolute rotary encoders or the like may be used. As the base length detector 42, a linear encoder may be used. Since vergence angle adjustment is performed by selecting angles from predetermined angles, the angle detectors 43 and 44 can be realized by microswitches or optical sensors.

Reference numeral 60 denotes a data mode switching button for cyclically changing a data storage mode, a display mode, and an OFF mode; 61, a selection button; 62, a determination button; and 63, a test chart display button.

The operation of the display apparatus of the above embodiment in operation will be described next.

Figure 9:
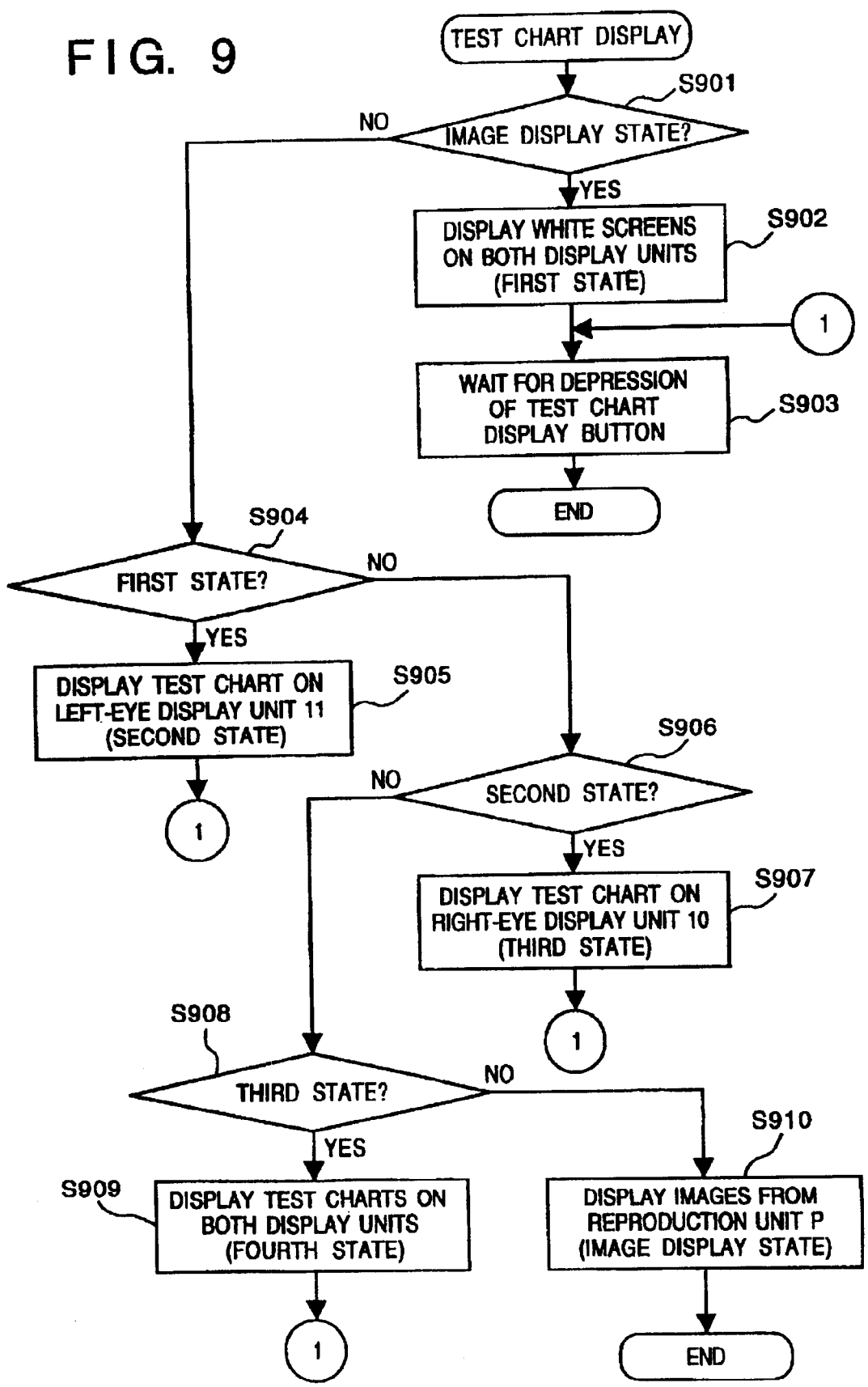
FIG. 9 is a flow chart showing processing to be performed upon depression of a test chart display button.

In order to comfortably use the display apparatus 1 of this embodiment, diopter adjustment, base length adjustment, and vergence angle adjustment must be performed in accordance with the characteristics of the user. The operation for such adjustment will be described below with reference to the flow chart in FIG. 9.

When the test chart display button 63 is depressed, for example, white screens are displayed on the two display units 10 and 11 (step S901). At this time, the display apparatus body is mounted on the head so that the left and right white images can be seen with the left and right eyes.

Figure 6:
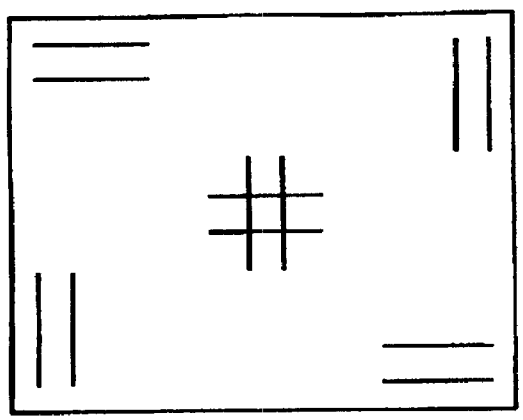
FIG. 6 is a view showing a test chart used in an adjusting operation for the display apparatus of the present invention.

When the test chart display button 63 is further depressed, a test chart is displayed on the left-eye display unit 11, as shown in FIG. 6 (step S905). The diopter adjustment dial 13 is rotated to perform focus adjustment so that the user can clearly see the graphic pattern at the central portion of the screen. The knob 20a of the base length adjustment mechanism is then moved such that the graphic patterns at the four corners can be seen with the same brightness.

When the test chart display button 63 is depressed again, the same chart is displayed on the right-eye display unit 10 (step S907), and the user performs diopter adjustment in the same manner as described above. When the test chart display button 63 is depressed again, the chart in FIG. 6 is displayed on each screen (step S909). If the graphic patterns at the four corners of the screen on the right eye side are equal in brightness, a vergence angle is selected. A vergence angle can be selected from three positions corresponding to 0° (parallel), 0.75°, and 1.5°. For example, "1.5°" corresponds to a state wherein the screen is located at a distance of about 2.5 m from the observer when the base length is 65 mm.

If the graphic patterns at the four corners are different in brightness, the user moves the display apparatus body in the X direction in FIG. 1 while changing the base length such that the graphic patterns at the four corners become equal in brightness. After this operation, the above selection of a vergence angle is performed. When the test chart display button 63 is depressed again, the test charts disappear, and image signals input the reproduction unit P are displayed on the display units 10 and 11 (step S910).

This display apparatus is designed for use in a home, an office, or the like. In particular, the display apparatus is designed for use by a plurality of users. More specifically, the above diopter, base length, and vergence angle data can be stored in the EEPROM 46. This operation will be described below with reference to the display samples in FIGS. 3A to 3D and the state transition chart in FIG. 8.

When the data mode switching button 60 is depressed in an OFF mode 801 after the apparatus is adjusted to allow the user to comfortably enjoy image display, a data storage mode (character display state) 802 is set.

Figure 3A:
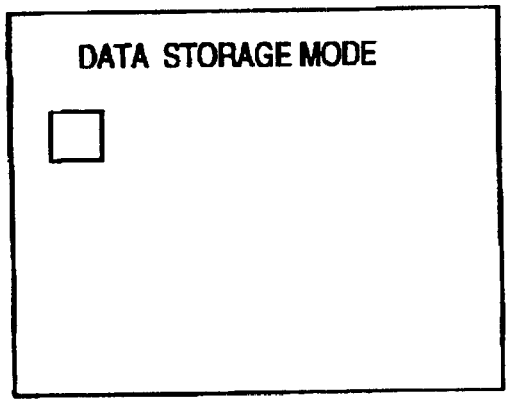
FIGS. 3A to 3D are views each showing a display screen of the display apparatus in an adjusting operation.

FIG. 3(a) shows the resultant screen display. In this case, "□" in FIG. 3A flickers.

Figure 3B:
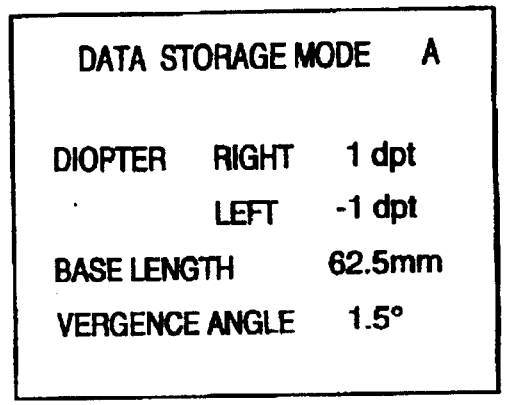

When the selection button 61 is depressed in this state, "A" is displayed first. Every time the selection button 61 is depressed afterward, "B", "C", . . . are sequentially displayed. When a desired character is displayed, and the determination button 62 is depressed, the current mode shifts to a data storage mode (current value display state) 803. FIG. 3B shows the resultant screen display. FIG. 3B shows a display sample obtained when the determination button 62 is depressed while "A" is displayed. On this display screen, the left and right diopters, the base length, and the vergence angle are displayed. These displayed values are data corresponding to the values of graduations converted from the output values of the respective detectors by the control unit 45.

If the selected character is a character which has already been used, this selection is canceled, and an input wait state is set while the display in FIG. 3A is kept. If the displayed data are appropriate, the determination button 62 is depressed. As a result, the data storage mode is ended to set the OFF mode 801, and the display disappears.

The initials of the user's name can be conveniently set as characters to be selected. If the displayed data are not to be stored, the determination button 62 is depressed while the selection button 61 is depressed. With this operation, the storage mode is canceled, and the OFF mode 801 is set without storing the data. Note that data corresponding to, e.g., 10 users can be stored in this data storage mode.

An operation to be performed when the user is to enjoy image display on the display apparatus 1 of this embodiment will be described next. Considering that the apparatus is used by a plurality of users, the adjustment position of the display apparatus 1 may not coincide with that of a user. For this reason, the switching button 60 is depressed twice to set a data display mode 804.

Figure 3C:
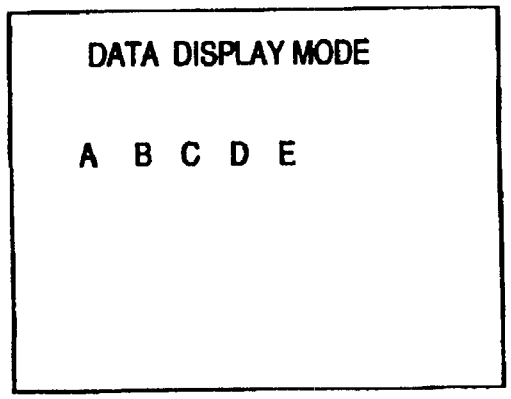

FIG. 3C shows the screen display in this case. FIG. 3C shows the characters "A" to "E", indicating that the data corresponding to five users are stored. When the selection button 61 is depressed, the character "A" flickers first. As the selection button 61 is depressed, the characters sequentially flicker.

Figure 3D:
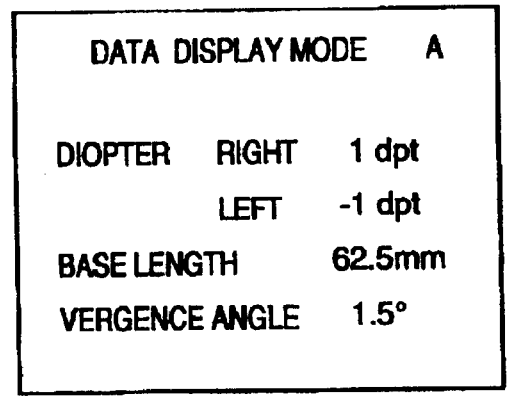

When the character corresponding to the desired data, i.e., the self-data, flickers, and the determination button 62 is depressed, the state shown in FIG. 3D is obtained. At this time, the displayed data include the left and right diopters, the base length, and the vergence angle, which have been stored in the data storage mode. If the user sets the adjustment units of the apparatus body according to the displayed data while seeing the data, the above adjustment procedures need not be repeated.

As described above, in adjusting diopters, a base length, and a vergence angle, which vary depending on the users, each user can perform adjustment while seeing the private data stored in advance. The users therefore need not repeat cumbersome adjustment procedures, i.e., mounting the apparatus and performing adjustment, every time the apparatus is used, and can easily use the apparatus.

Figure 10:
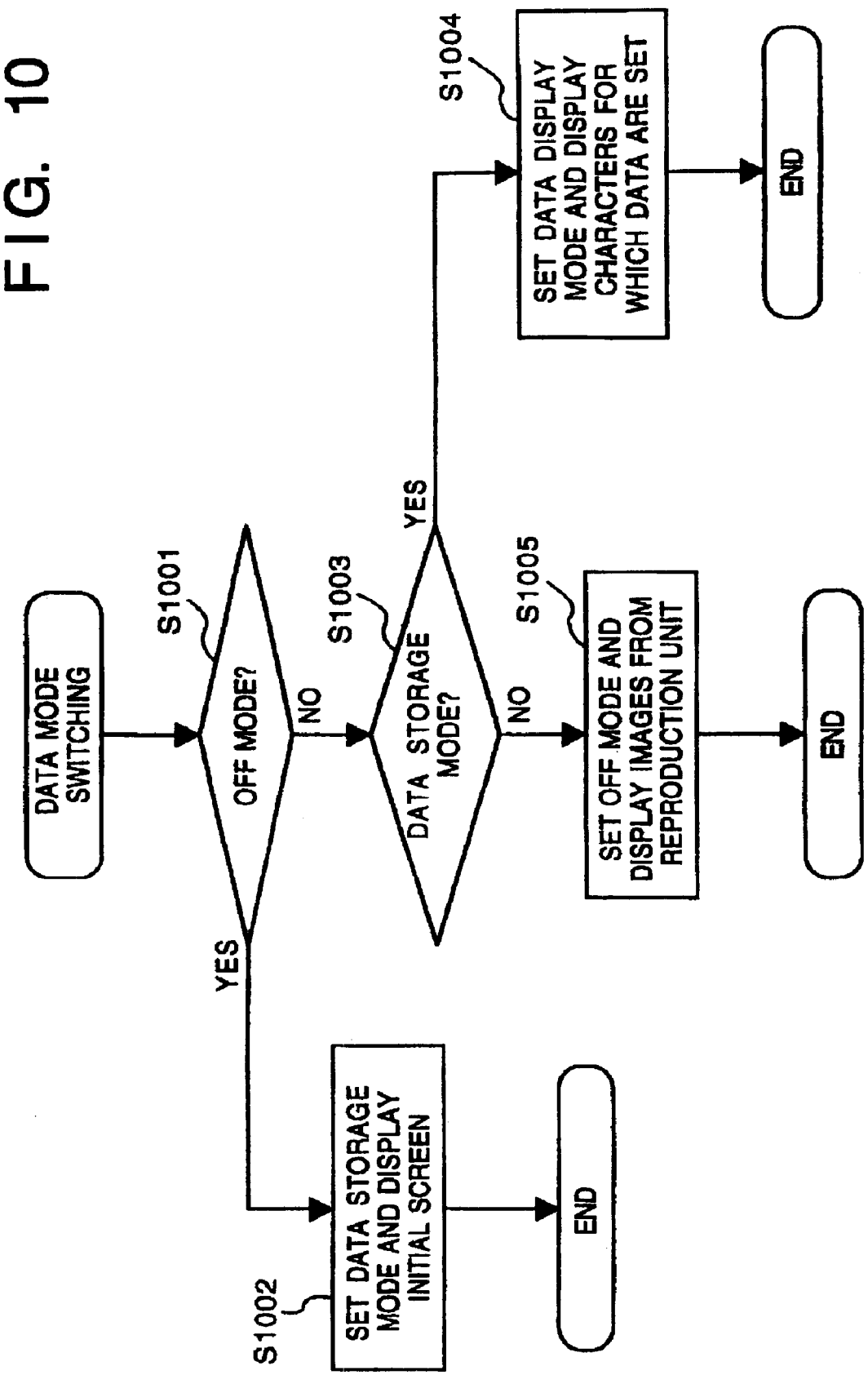
FIG. 10 is a flow chart showing processing to be performed upon depression of a data mode switching mode.
Figure 11:
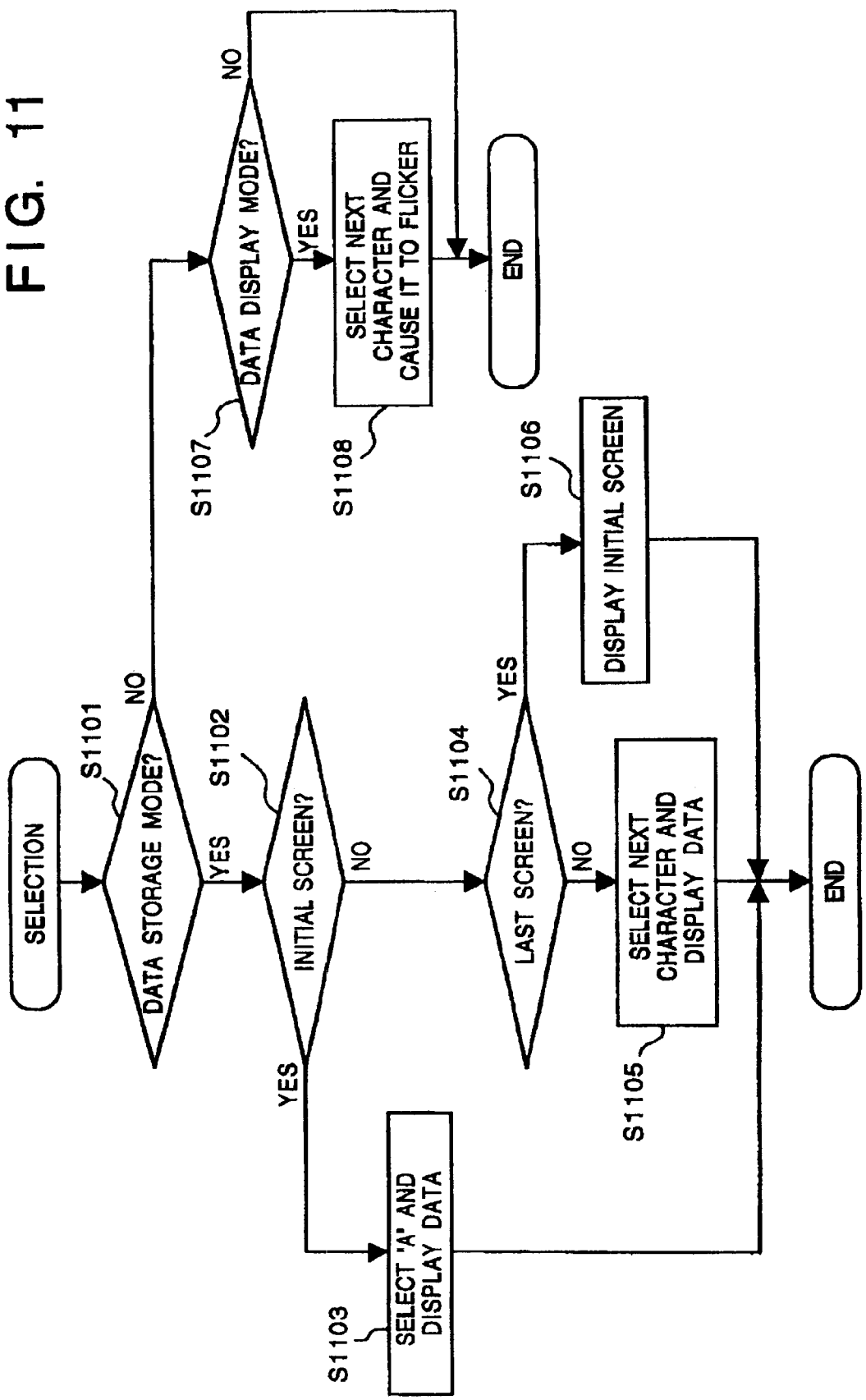
FIG. 11 is a flow chart showing processing to be performed upon depression of a selection button.
Figure 12:
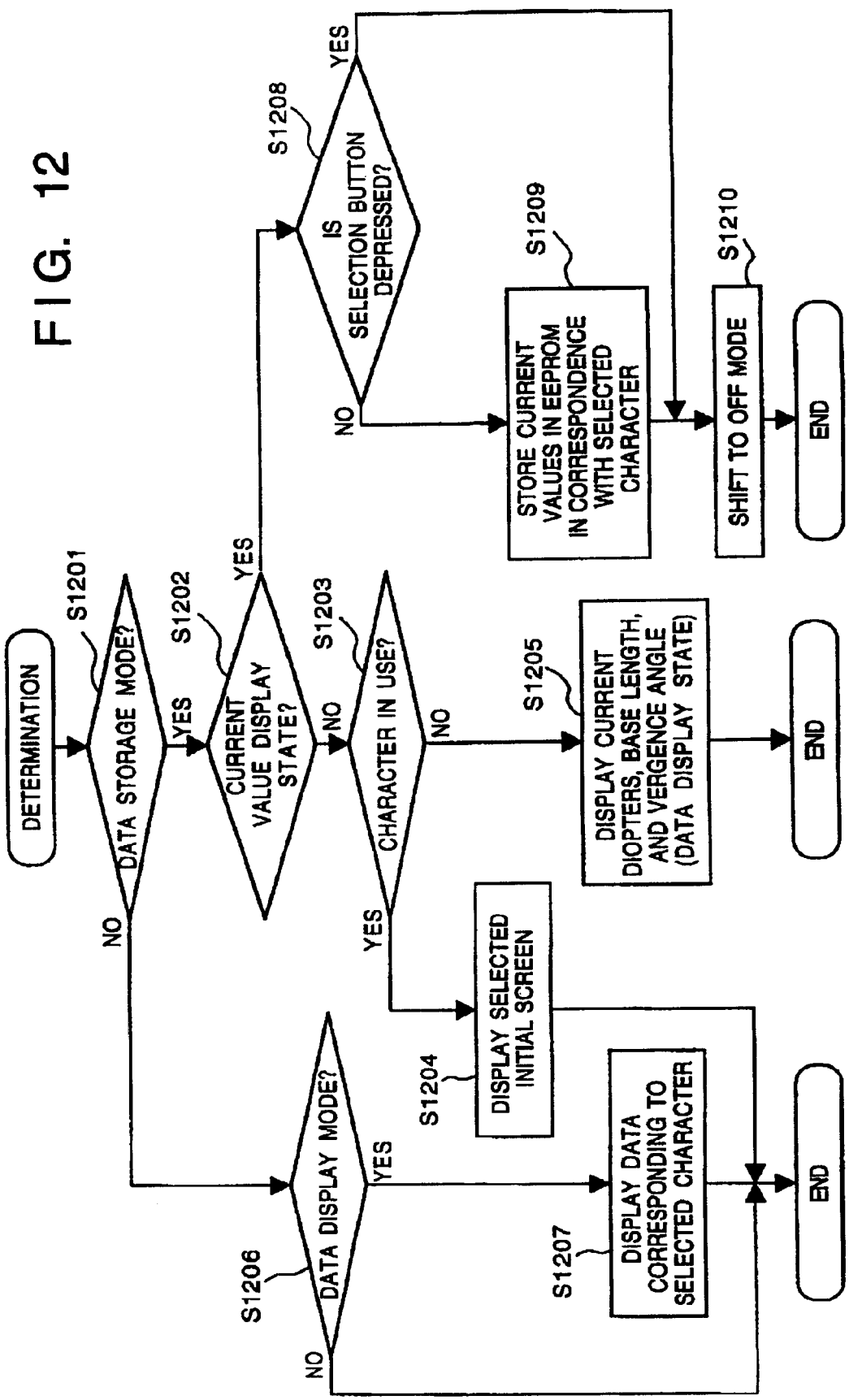
FIG. 12 is a flow chart showing processing to be performed upon depression of a determination button.

FIGS. 10 to 12 are flow charts showing the above control procedures corresponding to the following keys, respectively. FIG. 10 shows the procedure in the control unit 45 when a selection key is input; FIG. 11, the procedure for a selection key; and FIG. 12, the procedure for a determination key. These procedures are realized by causing a processor 452 to execute the programs stored in a program memory 451 incorporated in the control unit 45.

Since these flow charts obtained by rewriting the state transition chart in FIG. 8 into processes for the respective keys, the procedures indicated by the flow charts will be clearly understood by collating FIG. 8 with FIGS. 10 to 12.

Second Embodiment

A display apparatus according to the second embodiment of the present invention will be described next with reference to FIGS. 4 and 5.

The second embodiment is characterized in that two types of adjustment items, i.e., diopter and base length, are set, adjustment in operation is automated by using motors, and the brightnesses and volumes of left- and right-eye display units can be automatically adjusted. In addition, the base length is adjusted independently on the left and right eye sides. With this scheme, the adjustment processing is simplified.

This operation mechanism will be described below. The same reference numerals in the second embodiment denote the same parts as in the first embodiment, and a detailed description thereof will be omitted.

Figure 4:
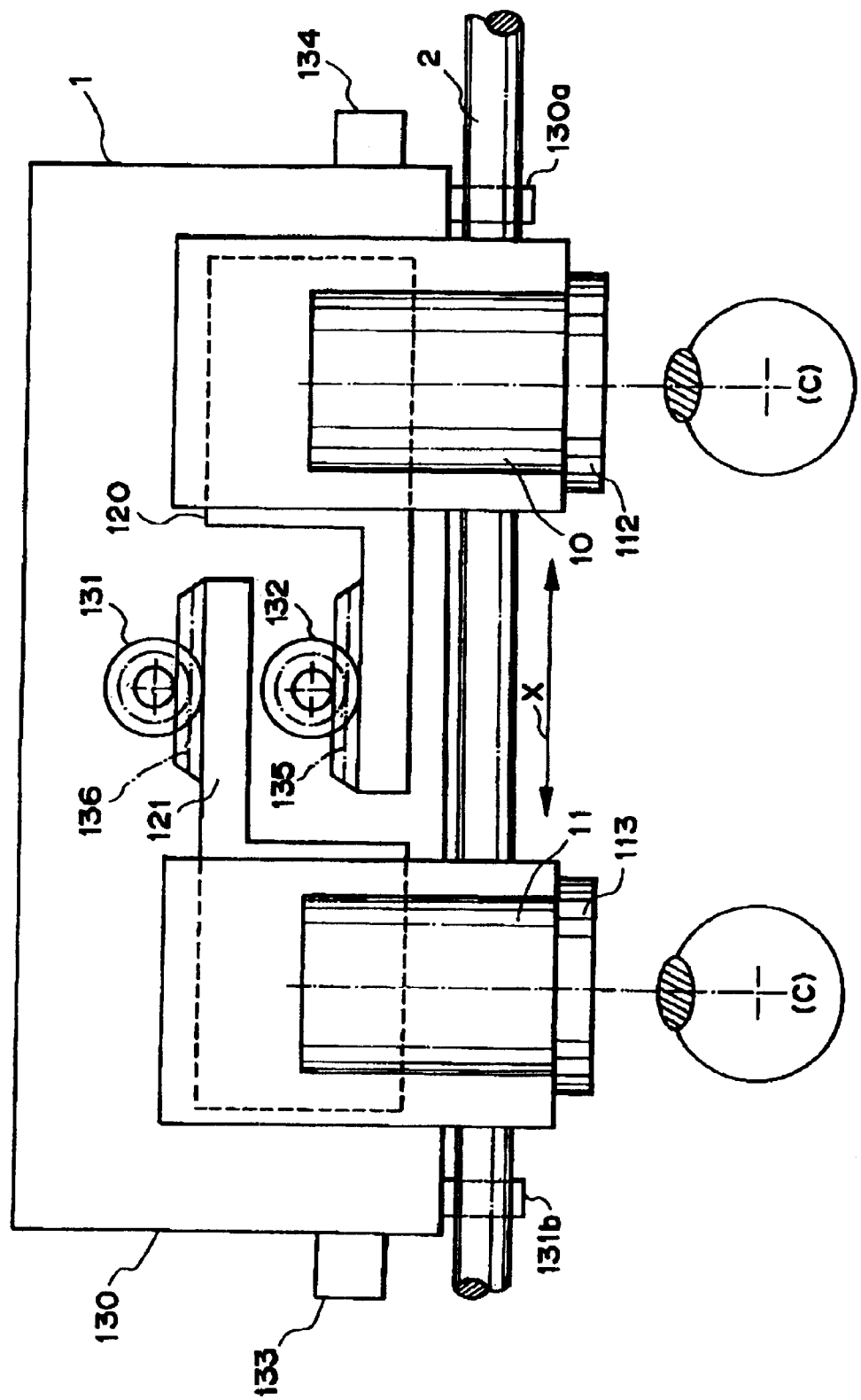
FIG. 4 is a view for explaining the mechanism of a display apparatus according to the second embodiment of the present invention.
Figure 5:
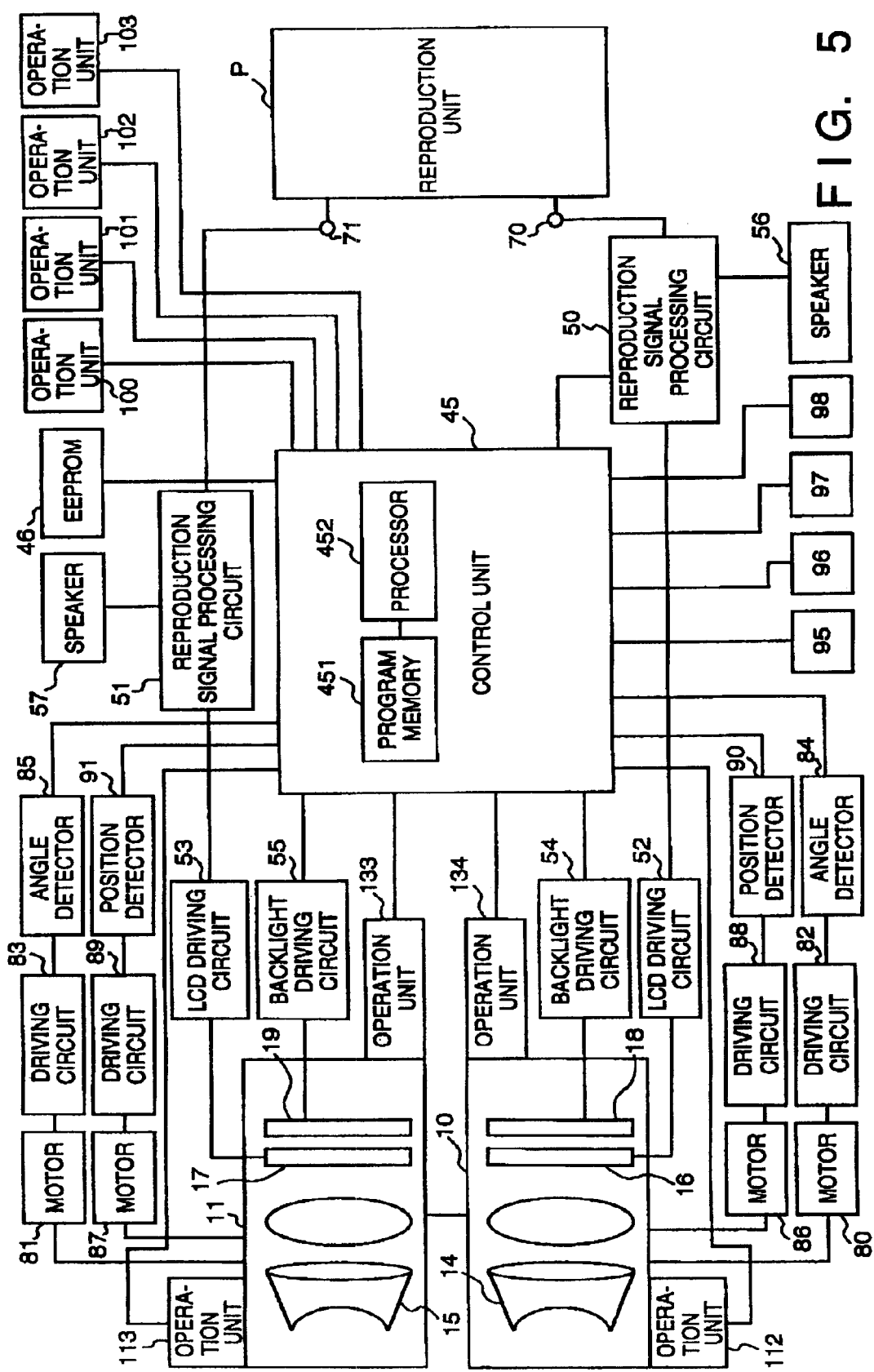
FIG. 5 is a block diagram showing the display apparatus of the second embodiment of the present invention.

Referring to FIG. 4, reference numeral 10 denotes a right-eye display unit; and 11, a left-eye display unit. Each display unit is constituted by a lens group, an LCD, a backlight, and the like, which will be described later. Reference numerals 112 and 113 denote diopter adjustment dials. When the dials are rotated, signals are generated to cause motors (not shown) to move portions of the lens groups so as to change the respective imaging positions.

Reference numeral 130 denotes a frame; and 120 and 121, base-length bases designed to be slidable in the X direction in FIG. 4 with respect to the frame 130. Linear racks 135 and 136 are respectively disposed on the right and left base-length bases 120 and 121 and meshed with gears 131 and 132 pivotally supported by the frame 130.

A motor (not shown) coupled to the gear 132 is rotated in response to a signal from an operation unit 134. As a result, the right base-length base 120 is slid to move right-eye display unit 10 in the X direction in FIG. 4. Similarly, a motor (not shown) coupled to the gear 131 is rotated in response to a signal from an operation unit 133. As a result, the left base-length base 121 is slid to move the left-eye display unit 11 in the X direction in FIG. 4. The vergence angle is fixed to, e.g., 1.5°. A frame 30 is coupled to a head contact portion 2 through coupling portions 130a and 130b.

The arrangement of the second embodiment will be described in detail next with reference to the block diagram in FIG. 5. In the following description as well, the same reference numerals denote the same parts as in the first embodiment, and a detailed description thereof will be omitted.

Image signals reproduced by a reproduction unit P are input to a display apparatus 1 through image signal input terminals 70 and 71. The input signals are respectively input to LCD driving circuits 52 and 53 through reproduction signal processing circuits 50 and 51. The LCDs are driven in accordance with the input image signals. Reference numerals 54 and 55 denote backlight driving circuits; and 56 and 57, headphones.

The apparatus includes the two display units, i.e., the right- and left-eye display units 10 and 11, which are respectively constituted by lens groups 14 and 15, LCDs 16 and 17, and backlights 18 and 19.

Reference numerals 80 and 81 denote motors for moving portions of the lens groups 14 and 15 in accordance with signals from operation units 112 and 113 to perform diopter adjustment; 82 and 83, driving circuits; and 84 and 85, angle detectors. The detected angles are input a control unit 45.

Reference numerals 86 and 87 denote motors for causing the left and right display units to be spaced apart from or come close to each other so as to adjust the base length in accordance with signals from the operation units 133 and 134; 88 and 89, driving circuits; and 90 and 91, position detectors. The positions detected by the position detectors 90 and 91 are input to the control unit 45. The distance between the left and right display units, i.e., the base length, can be detected on the basis of the two detected values.

Reference numeral 46 denotes an EEPROM for storing the diopter adjustment values, base length values, and vergence angle values in the two display units.

Reference numeral 95 denotes a data mode switching button; 96, a selection button; 97, a determination button; and 98, a test chart display button.

Figure 14:
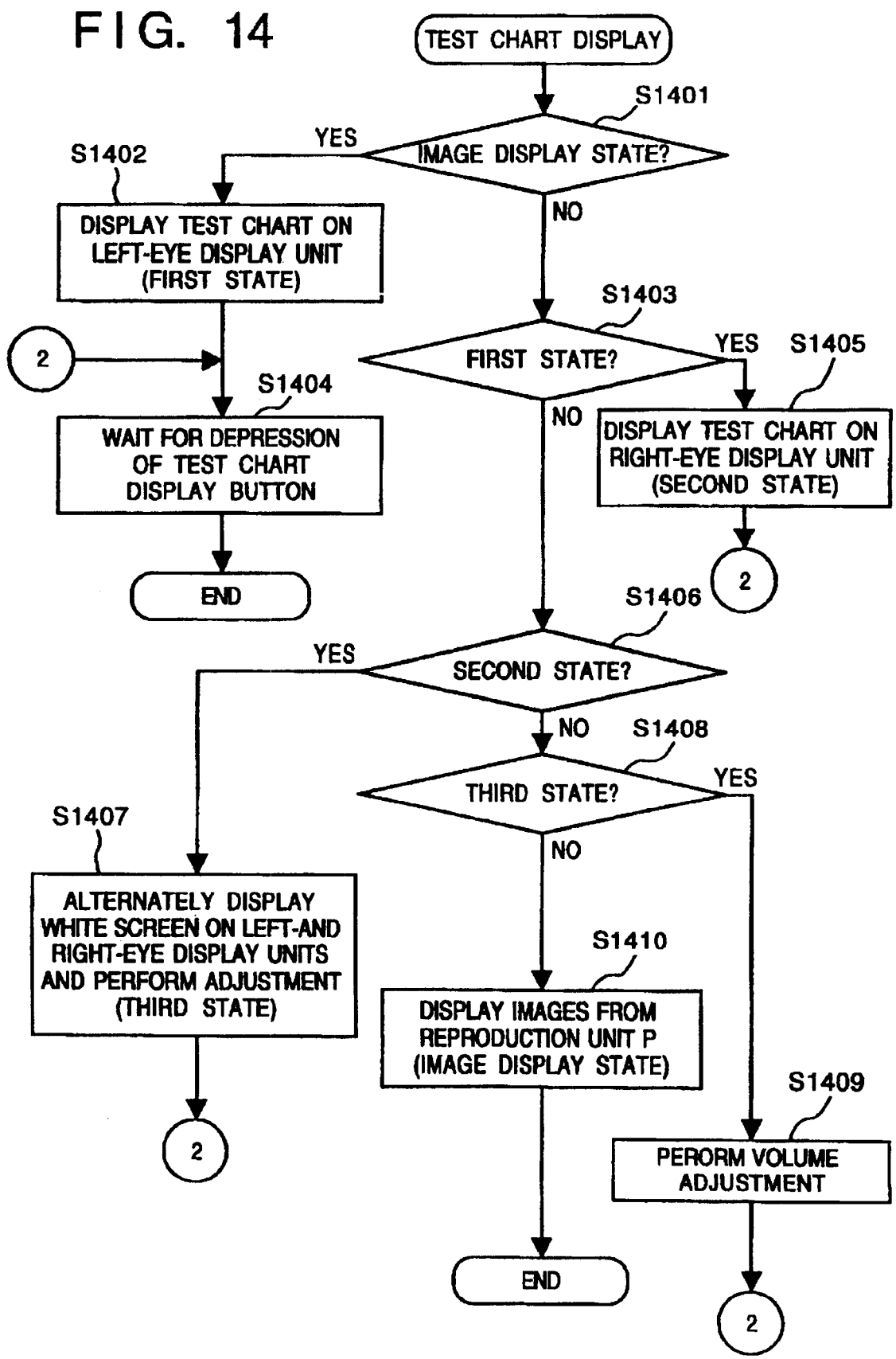
FIG. 14 is a flow chart showing processing to be performed upon depression of a test chart display button in the second embodiment.

The operation of the above embodiment in use will be described next. The procedure for adjusting the diopter and the like by displaying a test chart will be described first with reference to FIG. 14. The processing in FIG. 14 can be realized by causing the processor 452 to execute the programs stored in the program memory 451.

In order to comfortably use the display apparatus 1, diopter adjustment and base length adjustment must be performed. First of all, when the display apparatus body is mounted on the head of the user, and the user depresses the test chart display button 98, a test chart like the one shown in FIG. 6 is displayed on the left-eye display unit 11 (step S1402).

The operation unit 113 is then rotated to move the lens group 15 so as to change the focus state in such a manner that the graphic pattern at the central portion of the screen can be clearly seen. In addition, the operation unit 133 is operated such that the graphic patterns at the four corners of the screen can be seen with the same brightness.

When the button 98 is depressed again, the same chart is displayed on the right-eye display unit 10 (step S1405), and diopter adjustment and base length adjustment are performed in the same manner as on the left eye side. When the button 98 is depressed, white images are alternately displayed at predetermined time intervals (step S1407).

Subsequently, brightness operation units 100 and 101 are operated such that the left and right images can be seen with the same brightness. The operation unit 100 can increase/decrease the same brightness on the left and right eye sides, and the operation unit 101 can change the balance in brightness between the left and right eye sides. When the same brightness is set on the left and right eye sides, the button 98 is depressed to start volume adjustment (step S1409). As in brightness adjustment, in volume adjustment, the volumes are adjusted by an operation unit 102, and the balance in volume is adjusted by an operation unit 103. When proper left and right volumes are set, the button 98 is depressed, and the adjustment processing is ended.

According to the display apparatus 1 of the second embodiment, data associated with the above diopters, the base length, the balance in brightness between the left and right eye sides, the volumes, and the balance in volume can be stored in the EEPROM 46, and the apparatus can be automatically adjusted on the basis of the stored values. This operation will be described below with reference to FIGS. 7A to 13. Since the operation in the data storage mode is the same as in the first embodiment, a description thereof will be omitted.

An operation to be performed when the user is to enjoy image display on the display apparatus of this embodiment will be described next. Considering that the apparatus is used by a plurality of users, the adjustment position of the display apparatus 1 may not coincide with that of a user.

Figure 7A:
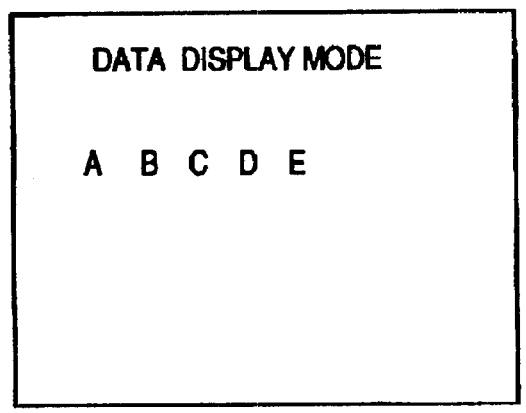
FIGS. 7A and 7B are views each showing a display screen of the display apparatus of the second embodiment of the present invention in an adjusting operation.

In this case, the data mode switching button 95 is depressed twice to set the data display mode (character display state) 1301. FIG. 7A shows the resultant screen display. FIG. 7A shows a case wherein the data of five users corresponding to the characters "A" to "E" are stored. When the selection button 96 is depressed, the character "A" flickers. As the selection button 96 is further depressed, the characters sequentially flicker.

Figure 7B:
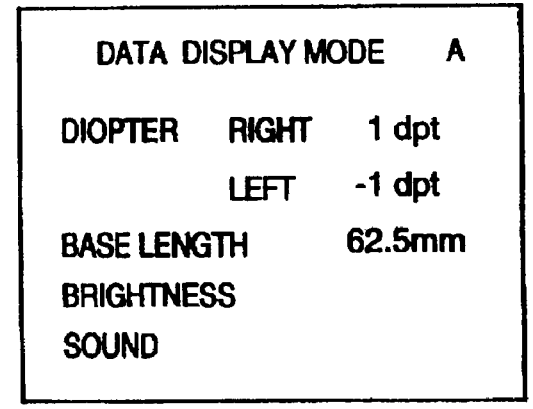

When the character corresponding to the desired data, i.e., the self-data, flickers, and the determination button 97 is depressed, the current mode shifts to a data display mode (data display state) 802, and the state shown in FIG. 7B appears. At this time, the displayed data include the left and right diopters and the base length, which have been stored in the data storage mode, together with the brightness and volume data.

If the data are to be used, the determination button 97 is depressed again. As a result, the respective units are automatically driven to set the diopters and base length based on the data, and the brightness and volume are adjusted.

Figure 13:
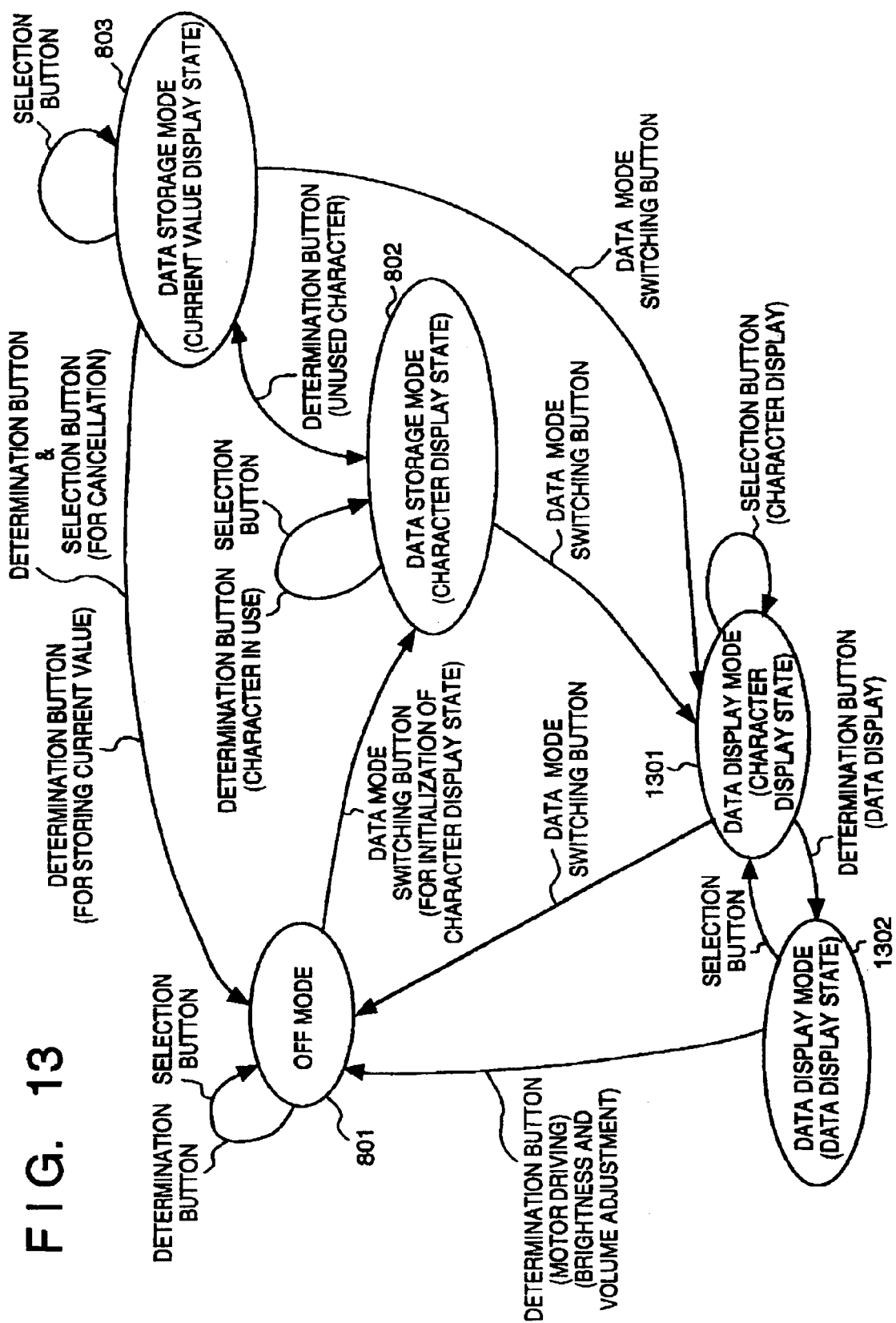
FIG. 13 is a view showing a state transition between the respective modes in the second embodiment.

Referring to FIG. 13, when the determination button is depressed in the mode 1032, an OFF mode 801 is set. However, the mode 1301 may be restored instead.

Figure 15:
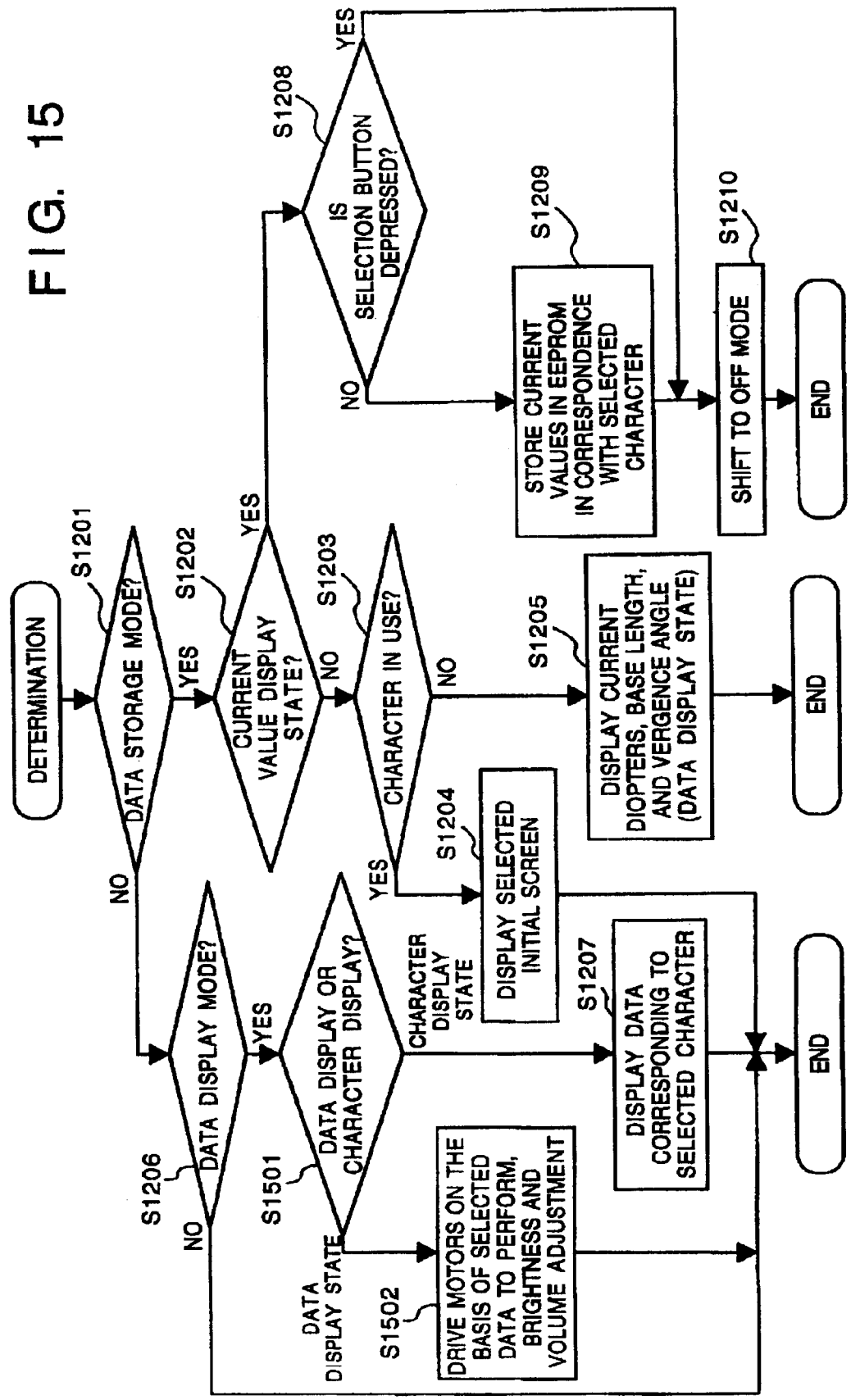
FIG. 15 is a flow chart showing processing to be performed upon depression of a determination button in the second embodiment.

FIG. 15 is a flow chart showing a procedure to be followed when the determination button is depressed. The procedures corresponding to the data mode switching button and the selection button may be the same as those in the first embodiment. The same reference numerals in FIG. 15 denote the same blocks in FIG. 12. The first embodiment is different from the second embodiment in that the determination button in the data display mode is used as a trigger for performing two steps, i.e., the step of displaying data and the step of controlling the respective units of the apparatus by using the displayed data.

As described above, in adjusting the diopters, base length, brightness, and volume, which vary depending on the users, adjustment can be automatically performed on the basis of private data stored in advance. The users therefore need not repeat cumbersome adjustment procedures, i.e., performing adjustment every time the apparatus is used, and can easily use the apparatus.

Third Embodiment

An embodiment of the head mount display apparatus of the present invention will be described below with reference to the accompanying drawings.

Figure 16:
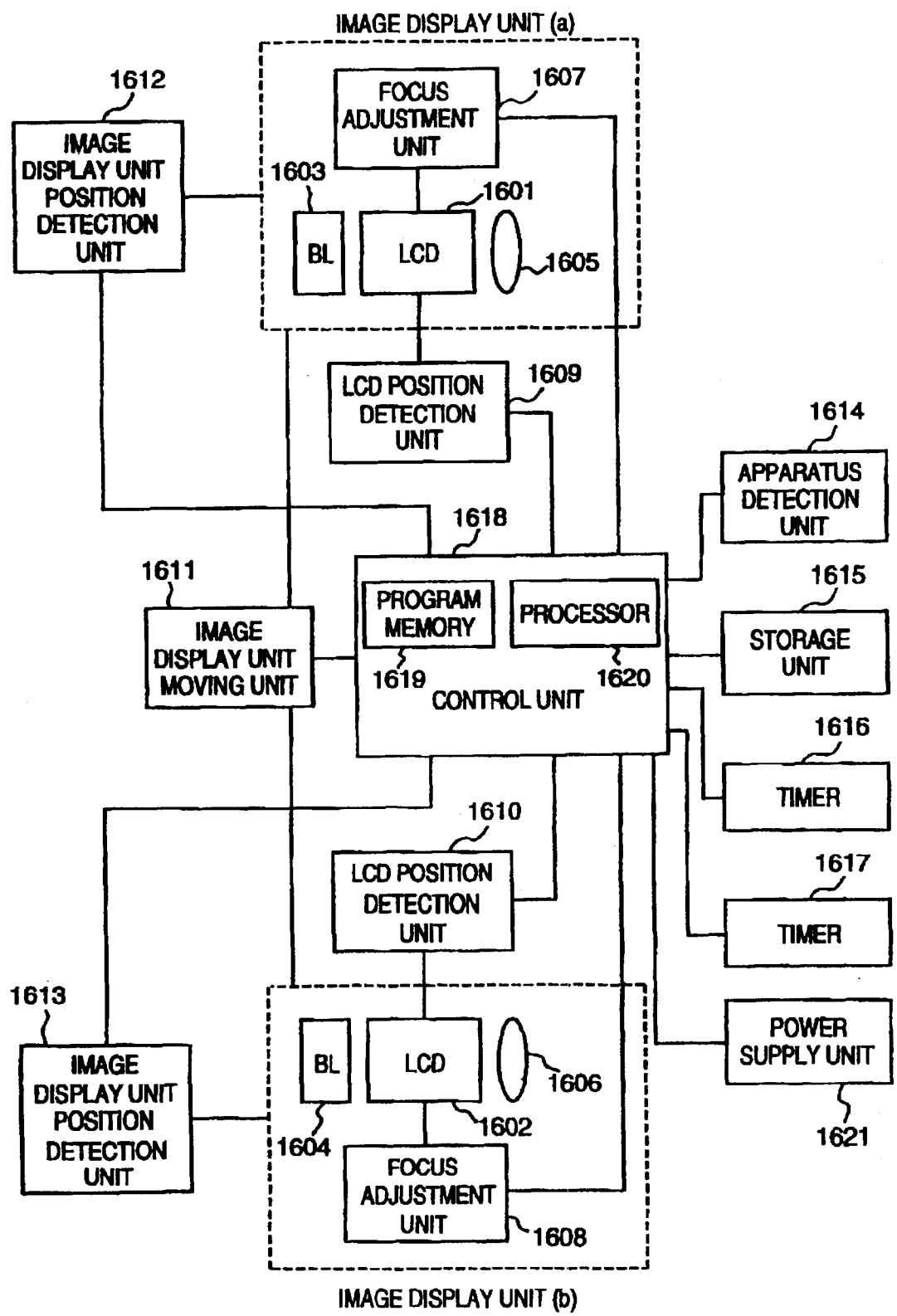
FIG. 16 is a block diagram showing the arrangement of a compound-eye display apparatus according to the third embodiment of the present invention.

FIG. 16 is a block diagram for explaining the arrangement of the present invention. Referring to FIG. 16, reference numerals 1601 and 1602 denote liquid crystal panels (LCDs) for displaying image information; 1603 and 1604, illumination units (BLs: backlights) for illuminating the liquid crystal panels 1601 and 1602; and 1605 and 1606, optical members for enlarging the image information displayed on the liquid crystal panels 1601 and 1602 at appropriate magnifications.

Reference numerals 1607 and 1608 denote focus adjustment units for moving the liquid crystal panels 1601 and 1602 to the in-focus positions with respect to the eyes of a user. The units respectively constituted by the above liquid crystal panels, illumination units, optical members, and focus adjustment units will be referred to as image display units (a) and (b) hereinafter. The image display units (a) and (b) are incorporated in a head-mounted display body like the one shown in FIG. 16 to display images to be seen with the left and right eyes of the user.

Reference numerals 1609 and 1610 denote liquid crystal panel position detection units for detecting the positions of the liquid crystal panels 1601 and 1602. Each liquid crystal panel position detection unit is constituted by a photointerrupter and the like.

Reference numeral 1611 denotes an image display unit moving unit for moving the image display units (a) and (b) in the horizontal direction in accordance with the base length (the distance between the eyes) of the user.

Reference numerals 1612 and 1613 denote image display unit position detection units which are constituted by photointerrupters and the like and adapted to detect the positions of the image display units (a) and (b); and, 1614, an apparatus detection unit which is constituted by a switch such as a push switch, an optical sensor, or the like and adapted to detect whether the compound-eye display apparatus is mounted on the head of the user.

Reference numeral 1615 denotes a position information storage unit for storing the positions of the image display units (a) and (b) and the liquid crystal panels 1601 and 1602. In this embodiment, this storage unit constituted by a nonvolatile memory such as an EEPROM.

Reference numeral 1616 denotes a first timer for measuring the position detection time of the image display unit moving unit 1611 and the focus adjustment units 1607 and 1608.

Reference numeral 1617 denotes a second timer for measuring the time during which a non-mounted state is detected by the apparatus detection unit 1614.

Reference numeral 1618 denotes a control unit for controlling the operations of the image display units (a) and (b), the image display unit moving unit 1611, the apparatus detection unit 1614, the position information storage unit 1615, the first timer 1616, and the second timer 1617. The control unit 1618 includes a program memory 1619 storing programs and the like and a processor 1620 for realizing the following control sequences by executing the programs.

Figure 17:
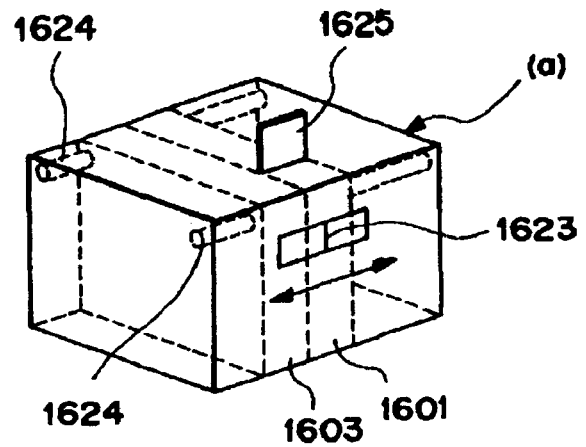
FIG. 17 is a perspective view schematically showing the arrangement of an image display unit.
Figure 18:
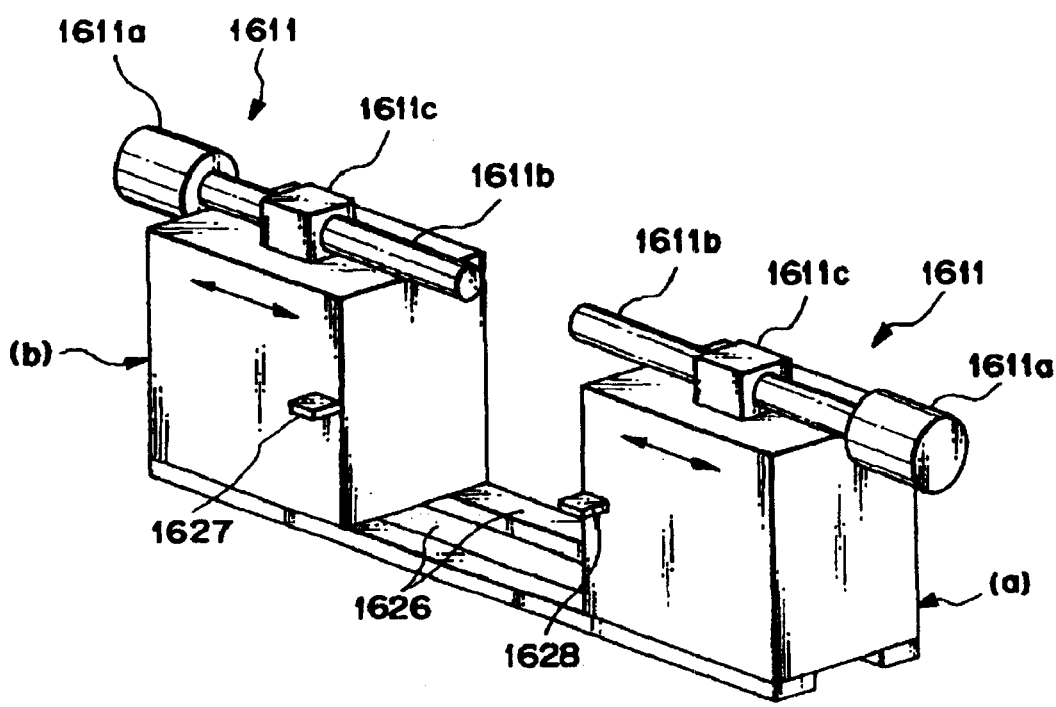
FIG. 18 is a perspective view schematically showing an image display unit moving unit.

The image display units (a) and (b) and the image display unit moving unit 1611 have the arrangements shown in FIGS. 17 and 18. Although FIG. 17 shows only one image display unit (a), the other image display unit (b) has the same arrangement as that of the unit (a).

Reference numeral 1621 denotes a power supply unit which is turned on/off by the user, and is also turned off by the control unit 1618.

Referring to FIG. 17, reference numeral 1623 denotes a liquid crystal panel moving knob for moving the liquid crystal panel 1601 and the BL 1603.

Reference numeral 1624 denotes movement rails for guiding the liquid crystal panel 1601 and the backlight 1603 to move them in a predetermined direction; and 1625, a light-shielding plate disposed on the liquid crystal panel 1601. The light-shielding plate 1625 is moved together with the liquid crystal panel 1601 and the backlight 1603, which are moved with the liquid crystal moving knob 1623.

When the light-shielding plate 1625 moves and crosses the liquid crystal panel position detection unit 1609 or 1610, the plate 1625 blocks light from a photosensor (not shown). As a result, the position of the liquid crystal panel is detected.

As shown in FIG. 18, the image display unit moving unit 1611 is disposed for each of the image display units (a) and (b), and is constituted by a movement motor 1611a, a screw rod 1611b rotated by the movement motor 1611a, and a movable member 1611c meshed with the screw rod 1611b.

The movable member 1611c is fastened on one end portion of each of the image display units (a) and (b). When the movement motor 1611a is driven to rotate the screw rod 1611b in a predetermined direction, the movable member 1611c threadably engaged with the screw rod 1611b moves along the axial direction of the screw rod 1611b.

With this operation, the image display units (a) and (b) fastened on the movable members 1611c are moved along movement rails 1626 in a predetermined direction, as indicated by the arrow in FIG. 18.

When light-shielding plates 1627 and 1628 cross the image display unit position detection units 1612 and 1613 and block light from the photosensors, the positions of the respective image display units are detected by the photosensors.

The operation of this embodiment will be described next with reference to the flow chart in FIG. 19. The processing in this flow chart is executed by the control unit 1618.

When the power supply is turned on, the control unit 1618 reads out position information from the position information storage unit 1615 in step S101, and the image display units (a) and (b) and the liquid crystal panels 1601 and 1602 are moved to predetermined positions (e.g., the middle points in adjustment ranges, end points in the adjustment ranges, or previous adjustment positions) by the image display unit moving units 1611 and the focus adjustment units 1607 and 1608.

The flow then advances to step S102, in which the control unit 1618 starts the first timer 1616 to start measuring the time until the image display units (a) and (b) or the liquid crystal panels 1601 and 1602 are moved.

The above time measurement is performed for a predetermined period of time. The predetermined period of time in this case is a time during which the user can satisfactorily enjoy image display at the current positions of the image display units (a) and (b) and the liquid crystal panels 1601 and 1602. In this case, the predetermined period of time is about five to ten minutes.

In step S103, the control unit 1618 checks whether the predetermined period of time has elapsed from the start of the first timer 1616 for time measurement. If YES in step S103, the processing is ended after pieces of position information detected by the position detection units 1609, 1610, 1612, and 1613 in step S108. If NO in step S103, the flow advances to step S104.

In step S104, the control unit 1618 detects the positions of the liquid crystal panels 1601 and 1602 and the image display units (a) and (b) through the liquid crystal panel position detection units 1609 and 1610 and the image display unit position detection units 1612 and 1613, and compares the detected positions with the initial positions set when the power supply was turned on, thereby calculating the moving amounts of the respective units.

The flow then advances to step S105 to compares the calculated moving amounts with a predetermined threshold. If any of the calculated moving amounts is equal to or larger than the threshold, it is determined that the corresponding position has changed (YES in step S105). As a result, the flow advances to step S107 to reset the first timer 1616 and restart time measurement. Thereafter, the flow returns to step S102.

If it is determined in step S105 that all the moving amounts are smaller than the threshold, it is determined that no movement has occurred. The flow then advances to step S106, in which the apparatus detection unit 1614 detects a mounted/non-mounted state of the head mount display apparatus.

If the mounted state of the head mount display apparatus is detected by the apparatus detection unit 1614 (YES in step S106), it is expected that the user performs adjustment and enjoys image display while the apparatus is mounted on the head of the user. For this reason, the processing in steps S103 to S106 is repeated to detect the positions of the respective units and the mounted/non-mounted state of the apparatus until the predetermined period of time elapses.

If it is determined in step S106 that the mounted state of the apparatus is not detected by the apparatus detection unit 1614, the flow advances to step S109 to start the second timer 1617 to start measuring the time of the non-mounted state.

In step S110, the mounted/non-mounted state of the compound-eye display apparatus is detected again. If the mounted state is detected before the predetermined period of time elapses, the flow advances to step S111 to reset the second timer 1617. Thereafter, the flow returns to step S103 to continue the position detecting operation.

If it is determined in step S110 that the mounted state of the apparatus is not detected, the flow advances to step S112 to check whether the predetermined period of time has elapsed. If NO in step S112, the flow returns to step S110 to repeat the above processing until the predetermined period of time elapses.

If it is determined in step S112 that the predetermined period of time has elapsed, it is regarded that the use of the compound-eye display apparatus is interrupted, and the flow advances to step S113 to turn off the power supply.

In a case other than the above cases, i.e., if the movement of the position of each unit is not detected within the predetermined period of time, and the mounted state of the apparatus is kept detected (YES in step S103), the flow advances to step S108 to detect the positions of the respective units through the liquid crystal panel position detection units 1609 and 1610 and the image display unit position detection units 1612 and 1613 and store the position information in the position information storage unit 1615.

In this case, the position information storage unit 1615 may be a memory such as a flash memory, an SRAM, or a DRAM (with a refresh function using a battery), a magnetic recording medium such as a magnetic tape, a floppy disk, or a hard disk, or a magnetooptical recording medium such as an optical disk or a magnetooptical disk.

As described above, since the head mount display apparatus of this embodiment includes the apparatus detection unit 1614, the position detection units 1609 and 1610 for the respective units, and the position information storage unit 1615, the position information of the image display units (a) and (b) and the liquid crystal panels 1601 and 1602 constituting the image display units are automatically stored in the position information storage unit 1615 after position adjustment is completed by the image display unit moving units 1611 and the focus adjustment units 1607 and 1608.

With this operation, the position information of the image display units (a) and (b) and the liquid crystal panels 1601 and 1602 can be reliably stored in the position information storage unit 1615 without performing a cumbersome storing operation.

The adjusted base length and diopter values stored in the position information storage unit 1615 are displayed upon conversion into values which can be read as numerical values as graduations marked on the focus adjustment units 1607 and 1608 and the image display unit moving units 1611 in the data display mode. With this operation, the user can easily perform position adjustment.

If the storage control of position information in this embodiment is combined with the second embodiment, an automatic position information storing operation can be realized. In addition, the motors for adjusting the diopters and the base length can be driven on the basis of the stored information. An adjusting operation therefore can be easily performed.

Fourth Embodiment

A head mount display apparatus according to the fourth embodiment of the present invention will be described next. Since the basic arrangement of the fourth embodiment is the same as that of the third embodiment, a detailed description of the arrangement will be omitted, and a function as a characteristic feature of the fourth embodiment will be described.

Figure 20:
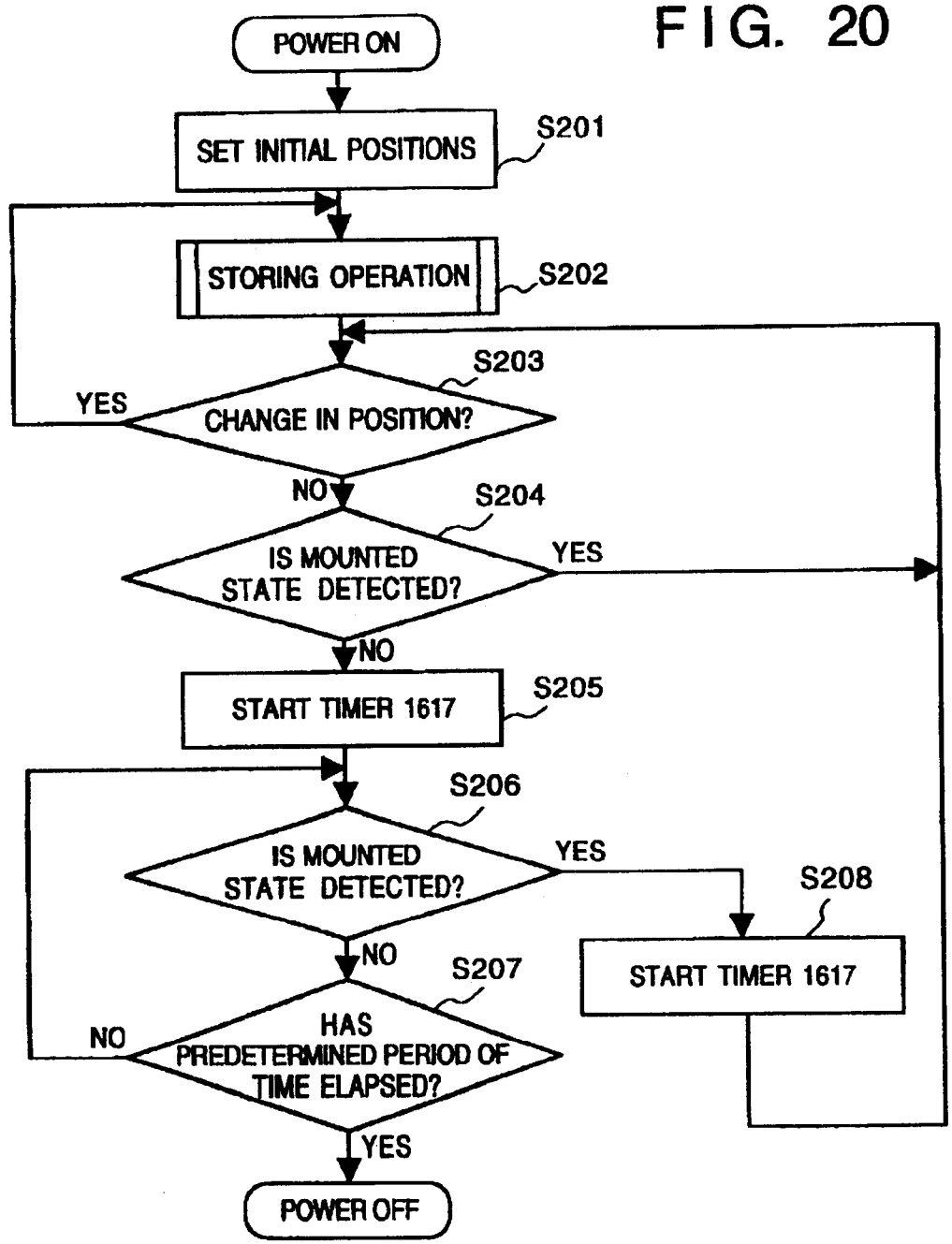
FIG. 20 is a flow chart showing the operation of the fourth embodiment of the present invention.

FIG. 20 is a flow chart for explaining a procedure in the compound-eye display apparatus of the fourth embodiment.

Figure 19:
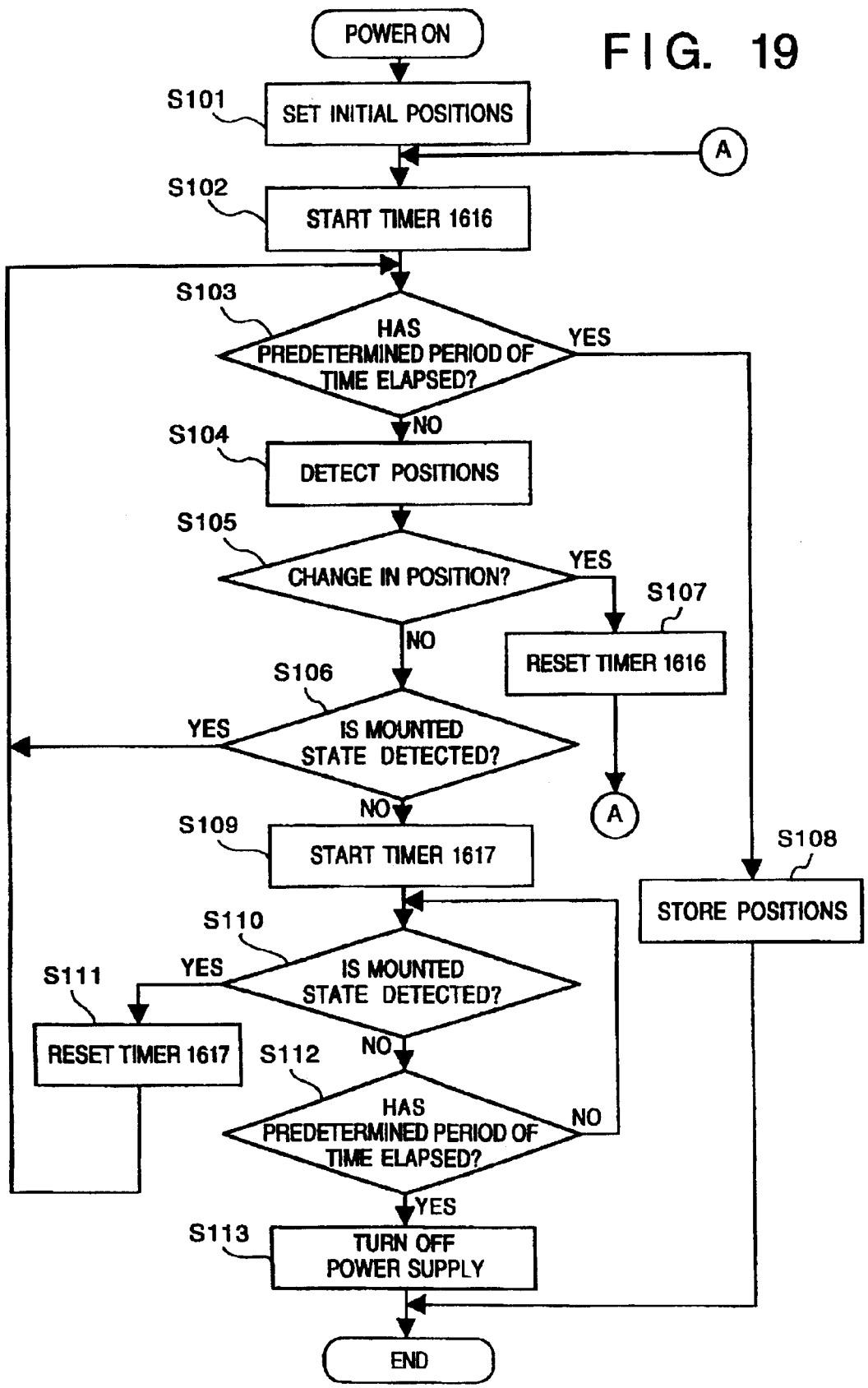
FIG. 19 is a flow chart showing the operation of the third embodiment.

In the fourth embodiment, the storing operation (step S202) in the flow chart in FIG. 20 is the same as the position information storing operation (steps S102 to S113) in the third embodiment in FIG. 19.

As shown in FIG. 20, when the power supply is turned on, the processing is started, and a control unit 1618 moves image display units (a) and (b) and liquid crystal panels 1601 and 1602 to predetermined initial positions (e.g., the middle points in adjustment ranges, end points in the adjustment ranges, or previous adjustment positions) through image display unit moving units 1611 and focus adjustment units 1607 and 1608 in step S201 as in the case of the third embodiment.

The flow then advances to step S202 to store the position information of the image display units (a) and (b) and the liquid crystal panels 1601 and 1602 in a position information storage unit 1615 upon the above-described storing operation. Thereafter, the flow advances to step S203 to detect changes in position through image display unit position detection units 1612 and 1613 and liquid crystal panel position detection units 1609 and 1610.

If it is determined that at least one of the image display units (a) and (b) and the liquid crystal panels 1601 and 1602 has moved by a threshold or more, the flow returns to step S202 to perform a storing operation again and update the position information as needed.

If it is determined in step S203 that any unit has not moved by the threshold or more, a mounted state detecting operation is performed.

In the mounted state detecting operation, the control unit 1618 detects through an apparatus detection unit 1614 whether the compound-eye display apparatus is mounted on the head of the user.

If YES in step S204, the flow returns to step S203 to detect the position of each unit again.

If it is determined in step S204 that the apparatus is not mounted on the head of the user, the control unit 1618 starts measuring the time of the non-mounted state through a second timer 1617. Thereafter, the flow advances to step S206 to detect the mounted/non-mounted state. If the mounted state is not detected, the flow advances to step S207 to check whether a predetermined period of time has elapsed.

If NO in step S207, the flow returns to step S206 to repeat the above processing.

If it is determined in step S207 that the predetermined period of time has elapsed, it is regarded that the use of the apparatus is interrupted, and the power supply of the compound-eye display apparatus is turned off.

If it is determined in step S206 that the mounted state is detected, the flow advances to step S208 to reset the second timer 1617. Thereafter, the flow returns to step S203.

In this embodiment, since position detection and detection of the mounted state are continuously performed in this manner, even if the positions of the image display units (a) and (b) and the liquid crystal panels 1601 and 1602 are changed while the head mount display apparatus is mounted on the head of the user, the position information can be updated.

Similar to the third embodiment, in this embodiment, the data storage mode in the first and second embodiments is used to facilitate the adjustment of the display apparatus. In addition, when the positions of the respective units are changed while the apparatus is mounted on the head of the user, new position information is stored, thereby facilitating adjustment.

Fifth Embodiment

A head mount display apparatus of the fifth embodiment of the present invention will be described next. Since the arrangement of the compound-eye display apparatus is the same as that of the third and fourth embodiments, a detailed description thereof will be omitted, and a function as a characteristic feature of the fifth embodiment will be mainly described.

Assume that a position information storage unit 1615 in this embodiment has a sufficient capacity for storing a plurality of pieces of position information. The fifth embodiment is associated with a method of setting initial positions (liquid crystal panels) after the power supply is turned on in the third and fourth embodiments. This operation will be described in detail below with reference to FIG. 21.

Figure 21:
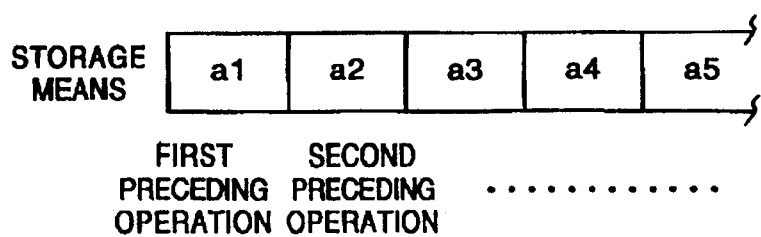
FIG. 21 is a view for explaining a state wherein pieces of position information corresponding to a predetermined number of times of adjusting operations are stored in a position information storage means.
Figure 22:
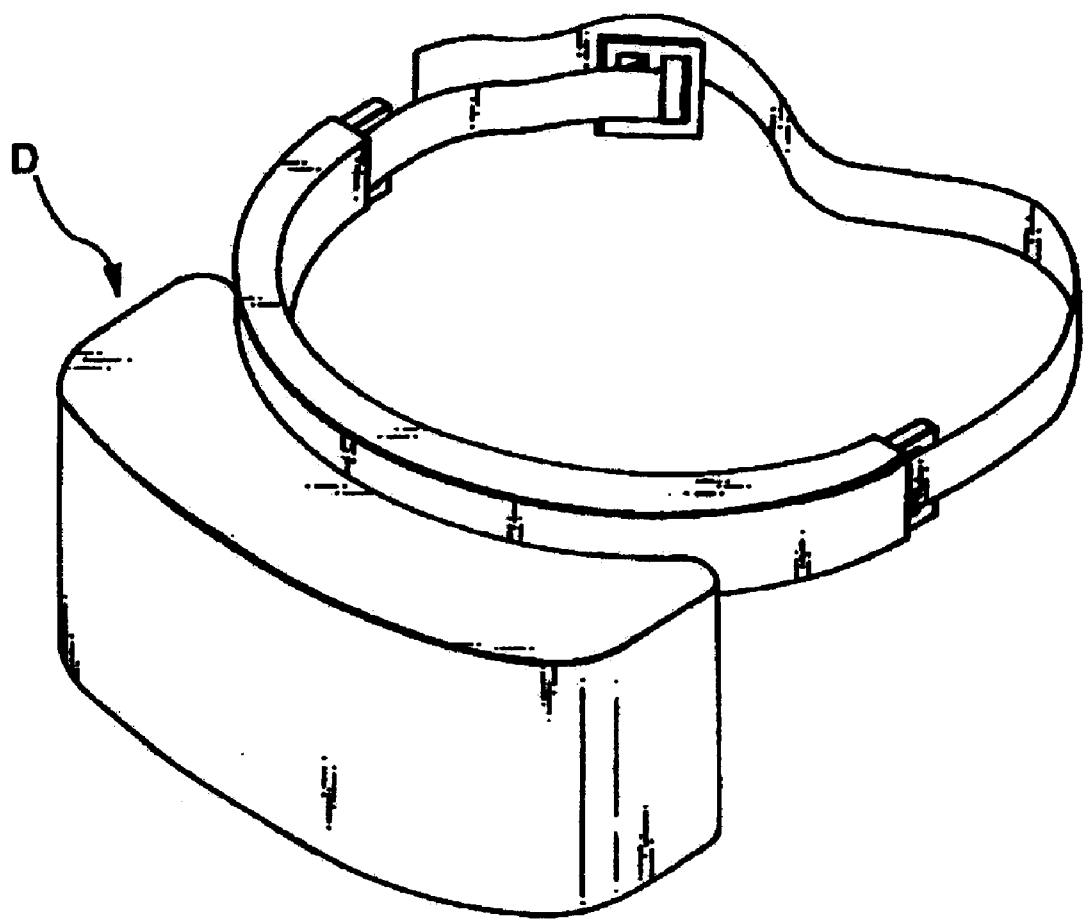
FIG. 22 is a perspective view showing the outer appearance of a general head-mounted display apparatus.

As shown in FIG. 21, when the power supply is turned on, a control unit 1618 reads out pieces of position information a1, a2, a3, a4, and a5, which correspond to X operations (five operations in this embodiment) after the previous operation, from the position information storage unit 1615. The average value of the pieces of information is calculated according to equation (1) below:

$$\text{initial position}=(a1+a2+a3+a4+a5)/5 \quad (1)$$

The value obtained by equation (1) is set as an initial set position.

The control unit 1618 then moves image display units (a) and (b) and liquid crystal panels 1601 and 1602 according to the initial set value obtained by equation (1) through display units 1611 and focus adjustment units 1607 and 1608.

Instead of calculating the average value of pieces of position information corresponding to five operations, an initial position may be calculated by using weighting coefficients like ½, ¼, ⅛, ¹/₁₆, and ¹/₃₂, which are sequentially set with respect to the position in the latest use of the apparatus, according to equation (2) below:

$$\text{initial position}=\tfrac{1}{2}*a1+\tfrac{1}{4}*a2+\tfrac{1}{8}*a3+\tfrac{1}{16}*a4+\tfrac{1}{32}*a5 \quad (2)$$

In this case, the weighting coefficients are not limited above coefficients but may be arbitrarily set.

In this manner, the average value of pieces of position information corresponding to the latest X operations is set as an initial position. With this operation, when the head mount display apparatus is used by a plurality of users, the initial position to be set when the power supply is turned on can be changed in accordance with the frequency in use, thereby facilitating eye point adjustment.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

The present invention is not limited to the above embodiments and various changes and modifications can be made within the spirit and scope of the present invention. Therefore, to apprise the public of the scope of the present invention, the following claims are made.

What is claimed is:

1. A display apparatus comprising:
   display means including a plurality of display units;
   imaging means for forming images displayed on said display unit through optical systems;
   adjustment means for adjusting said display means in a desired state;
   storage means for storing adjustment information corresponding to a state adjusted by said adjustment means;
   control means for reading the adjustment information stored in said storage means and supplying the adjustment information to said adjustment means so as to cause said adjustment means to adjust said display means in a state corresponding to the adjustment information; and
   storage control means for, when an adjustment state does not change for a predetermined period of time, causing said storage means to store the state.

2. The apparatus according to claim 1, wherein said adjustment means adjusts a diopter through said imaging means.

3. The apparatus according to claim 1, wherein said adjustment means adjusts a base length between said pair of display units.

4. The apparatus according to claim 1, wherein said adjustment means adjusts a vergence angle of said pair of display units.

5. The apparatus according to claim 1, wherein said display means includes a pair of display units whose relative positions and brightnesses are variable respectively display images with a parallax between left and right eyes of a user, thereby performing stereoscopic display.

6. The apparatus according to claim 1, wherein said adjustment means adjusts the brightnesses of said pair of display units.

7. The apparatus according to claim 1, wherein said adjustment means adjusts a brightnesses balance between said pair of display units.

8. The apparatus according to claim 1, further comprising sound control means including a pair of sound output units and second adjustment means for adjusting said sound output means.

9. The apparatus according to claim 8, wherein said second adjustment means adjusts volumes of said pair of sound output units.

10. The apparatus according to claim 8, wherein said second adjustment means adjusts a volume balance between said pair of sound output units.

11. The apparatus according to claim 1, wherein said control means causes said display means to display the state stored in said storage means.

12. The apparatus according to claim 1, further comprising first driving means for changing the base length by moving said pair of display units, and second driving means for adjusting diopters by driving said optical systems, and wherein said control means drives said first and second driving means on the basis of the state stored in said storage means.

13. The apparatus according to claim 1, further comprising mounted state detection means for detecting that said display means is mounted on the head of the user, so that when said mounted state detection means detects that said display means is mounted on the head of the user, said storage control means causes said storage means to store the state.

14. The apparatus according to claim 13, further comprising power supply means for supplying power to said apparatus, so that when said mounted state detection means detects that said display means is not mounted on the head of the user for the predetermined period of time after a power supply is turned, supply of power from said power supply means is stopped.

15. The apparatus according to claim 13, wherein when a change in adjustment state is occurred, a new adjustment state after the change is stored in said storage means even after an adjustment state is temporarily stored in said storage means.

16. The apparatus according to claim 1, further comprising first driving means for changing the base length by moving said pair of display units, and second driving means for adjusting the diopters by driving said optical systems.

17. The apparatus according to claim 16, further comprising initialization means for causing said driving means to set a predetermined initial state, the initial state being determined on the basis of a predetermined number of states stored in said storage means.

18. The apparatus according to claim 1, wherein said display means includes a pair of display units each of which corresponds to each of a pair of eyes of a user respectively and said adjustment means adjusts relative positions of the pair of display units in a desired state.

19. A display apparatus comprising:

display means including a plurality of display units;

imaging means for forming images displayed on said display unit through optical systems;

adjustment means for adjusting said display means in a desired state;

storage means for storing adjustment information corresponding to a state adjusted by said adjustment means;

control means for reading the adjustment information stored in said storage means and supplying the adjustment information to said adjustment means so as to cause said adjustment means to adjust said display means in a state corresponding to the adjustment information; and wherein said adjustment means includes pattern display means for displaying predetermined patterns on a central portion and four corner portions of a screen of each of the display units.

20. A method of controlling a display apparatus including a pair of display units, comprising:

an adjustment step of adjusting an operation state of each unit of said display apparatus on the basis of an instruction from a user;

a storage step of storing an adjustment information corresponding to the operation state adjusted in the adjustment step in memory means, said memory means retains the adjustment result;

a control step of reading the adjustment information stored in said memory means and supplying the adjustment information to said adjustment means so as to cause said adjustment means to adjust said display apparatus in a state corresponding to the adjustment information; and storage control step of, when an adjustment state does not change for a predetermined period of time, causing said memory means to store the state.

21. The method according to claim 20, further comprising a state display step of displaying a state adjusted in the adjustment step.

22. The method according to claim 20, wherein a diopter of each display unit is adjusted in the adjustment step.

23. The method according to claim 20, wherein a base length of said pair of display units is adjusted in the adjustment step.

24. The method according to claim 20, wherein a vergence angle of said pair of display units is adjusted in the adjustment step.

25. The method according to claim 20, wherein a brightness of each of said pair of display units is adjusted in the adjustment step.

26. The method according to claim 20, wherein a brightness balance between said pair of display units is adjusted in the adjustment step.

27. The method according to claim 20, wherein said display apparatus includes a pair of sound output units, and a volume of each of said pair of sound output units is adjusted in the adjustment step.

28. The method according to claim 27, wherein a volume balance between said pair of sound output units is adjusted in the adjustment step.

29. The method according to claim 20, wherein each of the pair of display units corresponds to each of a pair of eyes of a user respectively and relative positions of the pair of display units are adjusted in a desired state in the adjustment step.

30. A method of controlling a display apparatus including a pair of display units, comprising:

an adjustment step of adjusting an operating state of each unit of said display apparatus;

a storage step for storing adjustment information corresponding to each state adjusted in the adjustment step; and a display step of displaying each state stored in the storage step, wherein the adjustment step includes a step of displaying a white screen on each display unit, a step of displaying a predetermined pattern on one display unit, a state display step of displaying the pattern on the other display unit, and the step of displaying the pattern on both the display units.

31. A method of controlling a display apparatus including a pair of display units, comprising:

an adjustment step of adjusting an operating state of each unit of said display apparatus;

a storage step for storing adjustment information corresponding to each state adjusted in the adjustment step; and a display step of displaying each state stored in the storage step; and a step of setting each state stored in the storage step by driving said display units on the basis of the state stored in the storage step after the display step.

32. A method of controlling a display apparatus including a pair of display units, comprising:

an adjustment step of adjusting an operating state of each unit of said display apparatus;

a storage step for storing adjustment information corresponding to each state adjusted in the adjustment step; and a display step of displaying each state stored in the storage step;

wherein the adjustment step includes a stop of displaying a predetermined pattern on one display unit, a step of displaying the pattern on the other display unit, and a step of alternately displaying a white image on both the display units.

33. A method of controlling a display apparatus including a pair of display units, comprising:

an adjustment step of adjusting an operating state of each unit of said display apparatus;

a storage step for storing adjustment information corresponding to each state adjusted in the adjustment step; and a display step of displaying each state stored in the storage step, wherein the storage step includes a storage control step of detecting a state of each of said display units, detecting a used state of said display apparatus if the detected state undergoes no change, and storing the state if the state continues for not less than a predetermined period of time.

34. The apparatus according to claim 31, wherein the state is stored in the storage step again if the state of said display unit changes after the state is temporarily stored.

35. A method of controlling a display apparatus including a pair of display units, comprising:
- an adjustment step of adjusting an operating state of each unit of said display apparatus;
- a storage step for storing adjustment information corresponding to each state adjusted in the adjustment step; and
- a display step of displaying each state stored in the storage step, and
- an initialization step of setting said storage means on the basis of the state stored in the storage step, before the state is stored in the storage step.

36. A display apparatus comprising:
- display means including a plurality of display units;
- imaging means for forming images displayed on said display units through optical systems;
- adjustment means for adjusting a state of said display means to a desired state, the state including a diopter based on said imaging means and a base length of said pair of display units;
- storage means for storing adjustment information corresponding to a state adjusted by said adjustment means if the state continues for a predetermined period of time; and
- control means for outputting the adjustment information stored in said storage means and supplying the adjustment information to said adjustment means,
- wherein said adjustment means adjusts said display means in a state corresponding to the adjustment information when said adjustment means receives the adjustment information from said storage means.

* * * * *

UNITED STATES PATENT AND TRADEMARK OFFICE
CERTIFICATE OF CORRECTION

PATENT NO. : 6,600,461 B1
DATED : July 29, 2003
INVENTOR(S) : Okauchi et al.

It is certified that error appears in the above-identified patent and that said Letters Patent is hereby corrected as shown below:

Title page,
Item [75], Inventor, after "Okauchi," delete "Kodaira (JP)" and insert therefor
-- Tokyo (JP) --
Item [56], References Cited, U.S. PATENT DOCUMENTS,
delete "5,642,221 A * Fisher et al      345/8" and insert
-- 5,642,221 A * Fisher et al     345/477 --
delete "5,662,523 A * Yasumaru et al    345/8" and insert
-- 5,642,221 A * Fisher et al    463/30 --

Column 4,
Line 27, delete "denotes-vergence" and insert -- denotes vergence --

Column 12,
Line 32, delete "The-flow" and insert -- The flow --

Column 16,
Line 21, delete "brightnesses" and insert -- brightness --

Column 20,
Line 15, delete "said storage means" and insert -- said adjustment means --

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,600,461 B1 Page 1 of 1
DATED : July 29, 2003
INVENTOR(S) : Okauchi et al.

It is certified that error appears in the above-identified patent and that said Letters Patent is hereby corrected as shown below:

Title page,
Item [56], References Cited, U.S. PATENT DOCUMENTS, delete "5,642,221 A * Fisher et al 463/30" and insert -- 5,662,523 A * Yasumaru et al 463/30 --

Signed and Sealed this

Twenty-eighth Day of June, 2005

JON W. DUDAS
*Director of the United States Patent and Trademark Office*